(12) United States Patent
Matin et al.

(10) Patent No.: US 12,206,464 B2
(45) Date of Patent: Jan. 21, 2025

(54) REDUCING ERRANT MEASUREMENT REPORT TIMER DEACTIVATION USING LAYER 3 FILTER AUGMENTATION

(71) Applicant: Apple Inc., Cupertino, CA (US)

(72) Inventors: Sharif Ahsanul Matin, San Diego, CA (US); Christian Hofmann, Munich (DE)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 17/484,664

(22) Filed: Sep. 24, 2021

(65) Prior Publication Data

US 2023/0102971 A1  Mar. 30, 2023

(51) Int. Cl.
*H04B 17/373* (2015.01)
*H04B 17/309* (2015.01)
(Continued)

(52) U.S. Cl.
CPC ......... *H04B 17/373* (2015.01); *H04B 17/309* (2015.01); *H04W 24/10* (2013.01);
(Continued)

(58) Field of Classification Search
CPC . H04W 24/10; H04W 72/0446; H04W 76/38; H04W 76/15; H04W 76/27;
(Continued)

(56) References Cited

U.S. PATENT DOCUMENTS

2006/0073830 A1 * 4/2006 Park ................... H04W 36/18
  455/442
2007/0287510 A1 * 12/2007 G. Nader ............. H04B 17/309
  455/574
(Continued)

FOREIGN PATENT DOCUMENTS

EP  2364049 B1 * 6/2012 ........... H04W 48/16
EP  2608428      6/2013
KR  101752063    7/2017

OTHER PUBLICATIONS

Extended European Search Report in European Appln. No. 22182014.5, dated Dec. 13, 2022, 9 pages.
(Continued)

*Primary Examiner* — Un C Cho
*Assistant Examiner* — Rasha K Fayed
(74) *Attorney, Agent, or Firm* — Fish & Richardson P.C.

(57) ABSTRACT

An apparatus to be implemented in a user equipment (UE), the apparatus comprising hardware circuitry to activate a timer for transmitting a measurement report to a base station; output a filtered signal value from a measured signal using a first parameter; determine a trend in signal quality based on the first filtered signal value and a second filtered signal value based on a second parameter; or some processing of the values either from the first filter or from the received signal; and determine whether to deactivate the timer based on the trend in signal quality. The filtered signal can be generated using a first layer 3 filter using network-configured parameters and a second layer 3 filter using proprietary parameters. Processing of the values can also be done using proprietary parameters and techniques.

20 Claims, 16 Drawing Sheets

(51) Int. Cl.
  *H04W 24/10* (2009.01)
  *H04W 36/00* (2009.01)
  *H04W 72/0446* (2023.01)
  *H04W 76/38* (2018.01)
(52) U.S. Cl.
  CPC . *H04W 36/00837* (2018.08); *H04W 72/0446* (2013.01); *H04W 76/38* (2018.02)
(58) Field of Classification Search
  CPC ........... H04W 88/02; H04W 36/00837; H04W 36/0085; H04W 36/30; H04W 36/04; H04W 36/0079; H04W 36/08; H04W 36/0088; H04W 36/26; H04W 48/16; H04W 4/40; H04W 28/06; H04L 5/0057; H04L 5/0048; H04L 69/325; H04L 1/0026; H04L 1/1812; H04L 1/08; H04L 1/22; H04B 17/373; H04B 17/309; Y02D 30/70
  See application file for complete search history.

(56) References Cited

U.S. PATENT DOCUMENTS

| | | | | |
|---|---|---|---|---|
| 2009/0267615 | A1* | 10/2009 | Jones | G01R 29/0892 702/57 |
| 2010/0234014 | A1* | 9/2010 | Virkki | H04W 36/0088 455/423 |
| 2012/0253214 | A1* | 10/2012 | Fu | A61B 5/7289 600/529 |
| 2014/0031027 | A1* | 1/2014 | Dalsgaard | H04W 36/0088 455/418 |
| 2014/0248840 | A1* | 9/2014 | Karri | H04W 48/16 455/67.11 |
| 2014/0335880 | A1* | 11/2014 | Lindoff | H04B 17/327 455/452.1 |
| 2014/0348010 | A1* | 11/2014 | Kanamarlapudi | H04W 52/0245 370/252 |
| 2016/0183154 | A1* | 6/2016 | Van Der Velde | H04W 36/0085 370/331 |
| 2017/0215117 | A1* | 7/2017 | Kwon | H04W 36/0094 |
| 2017/0325140 | A1* | 11/2017 | Da Silva | H04W 36/302 |
| 2018/0020380 | A1* | 1/2018 | Wang | H04W 36/0085 |
| 2018/0317113 | A1* | 11/2018 | Kim | H04W 24/08 |
| 2020/0064444 | A1* | 2/2020 | Regani | G01S 7/417 |
| 2020/0374960 | A1* | 11/2020 | Deenoo | H04B 7/0695 |
| 2021/0037403 | A1* | 2/2021 | Kim | H04W 48/12 |
| 2021/0168650 | A1* | 6/2021 | Mok | H04W 76/15 |
| 2021/0283983 | A1* | 9/2021 | Borlepawar | B60K 35/85 |
| 2022/0007570 | A1* | 1/2022 | Foster | A01D 34/78 |
| 2023/0102971 | A1* | 3/2023 | Matin | H04W 36/00837 370/329 |

OTHER PUBLICATIONS

[No Author Listed], "5G; NR; User Equipment (UE) conformance specification; Radio Resource Management (RRM), 3GPP TS 38.533 version 16.4.0, Release 16," 3GPP, Sep. 2020, 1314 pages.

[No Author Listed], "LTE; Evolved Universal Terrestrial Radio Access; User Equipment (UE) conformance specification; Radio transmission and reception; Part 3: Radio Resource Management (RRM) conference test, ETSI TS 36.521-3, V10.5.0," 3GPP, Nov. 2011, 29 pages.

[No Author Listed], "3rd Generation Partnership Project; Technical Specification Group Radio Access Network; NR; Requirements for support of radio resource management (Release 17), 3GPP TS 38.133, V 17.2.0," 3GPP, Jun. 2021, 1429 pages.

[No Author Listed], "3rd Generation Partnership Project; Technical Specification Group Radio Access Network; NR; NR and NG-RAN Overall Description; Stage 2 (Release 16), 3GPP TS 38.300 V.16. 6.0," Jun. 2021, 152 pages.

* cited by examiner

REDUCING ERRANT MEASUREMENT REPORT TIMER DEACTIVATION USING LAYER 3 FILTER AUGMENTATION

FIELD

This disclosure generally relates to electronic communications. More specifically, this application pertains to filtering cellular signal measurement peaks to accurately assess measurement report timer control.

BACKGROUND

Wireless communication devices operating on a cellular network are generally configured to report cell measurements for a current serving cell and/or for one or more neighbor cells to support possible handovers. When a filtered signal power or quality drops below a threshold value, a measurement report timer (or time-to-trigger) is started. A measurement report can be sent to the network to trigger a handover after the expiration of the measurement report timer.

DETAILED DESCRIPTION

Figure 1:
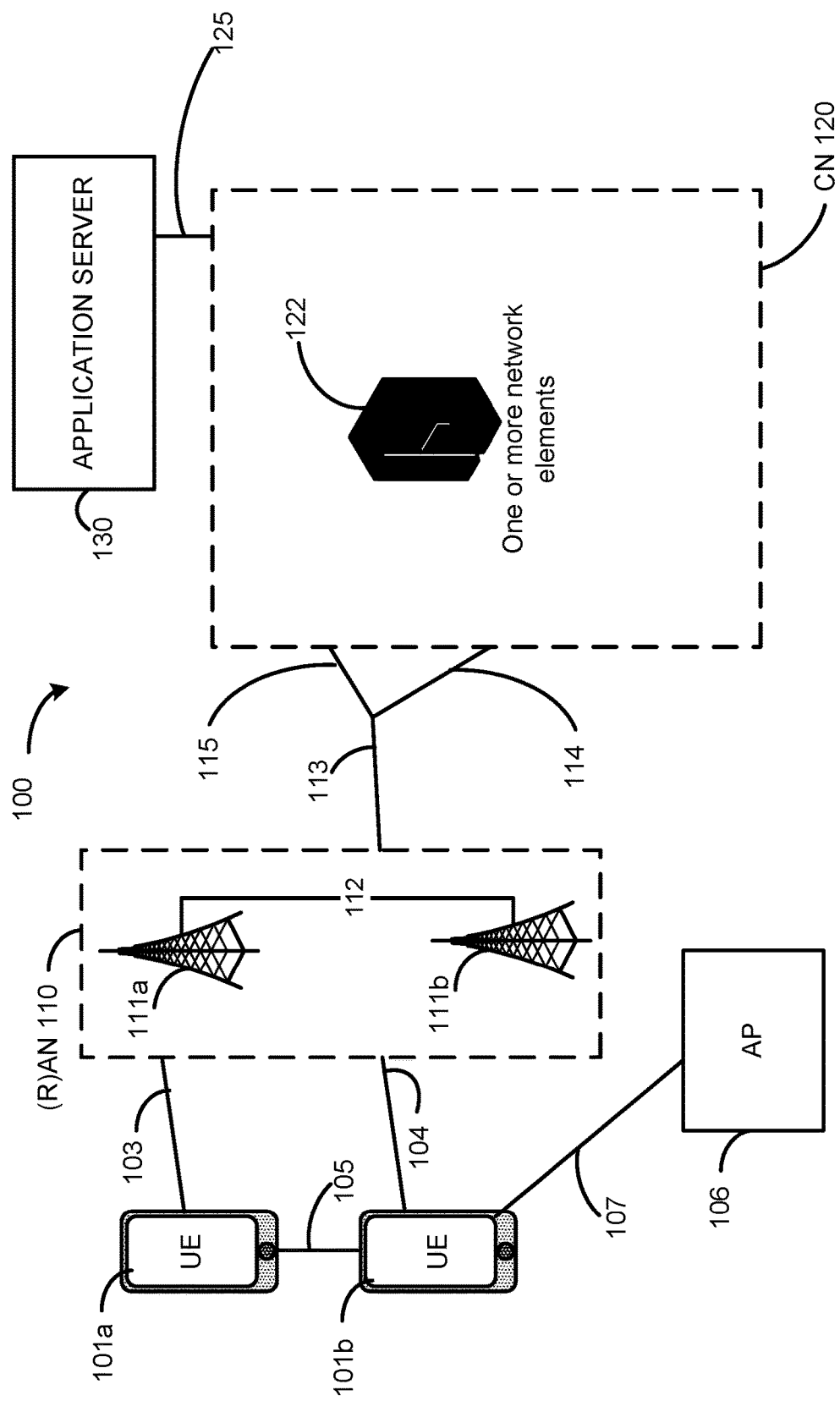
FIG. 1 illustrates an example of a wireless communication system.

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In a cellular network deployment, a wireless communication device (such as a user equipment (UE)) can be configured to perform measurements for a current serving cell and/or for one or more neighbor cells to support potential handovers. For example, a wireless communication device can be configured by a serving base station to report reference signal received power (RSRP) and reference signal received quality (RSRQ) measurements after the expiration of a measurement report timer. Such reports can be sent using measurement report messages (MRM). The measurement report timer or time-to-trigger (TTT) can be started when a measured signal value crosses below threshold value. The measurement report timer or TTT can be reset, however, when a measured signal crosses above a threshold value. Noise forming peaks in the received signal power or quality, however, can reset the timer erroneously.

MRMs generated by a UE based on solely Layer 3 filtered values of Measurement Objects (RSRP, RSRQ, SINR, Path Loss, etc.) may sometimes be insufficient for smooth call processing, handover, etc. The result can include packet loss or call drops.

When a TTT is set and running due to a certain Measurement. Object satisfying a threshold value, a momentary noisy peak can appear, even with a filtered signal, to invalidate the criteria and reset the TTT. After a UE resets the TTT, the UE will restart the TTT the next time when the measurement object satisfies the threshold, which usually occurs in next sample or within a few samples.

Such multiple sets/resets of TTT eventually delay the reporting of the MRM. By the time the UE actually transmits the MRM over the air, the received signal can be already poor enough to complete the RRC procedures as follow thru.

Sometimes, it's been noticed that UE cannot even receive the L2-Ack of this message from the NW, let alone L3 responses.

The call drops due to either RL Failure, or RLC Resets in SRB (signaling radio bearer.)

The issue is more visible, understandably, in the carriers which use larger TTT. And which is the case with many carriers.

For example, in an LTE network a wireless communication device can be required to report reference signal received power (RSRP) and reference signal received quality (RSRQ) measurements for defined events. In many networks, a wireless communication device is configured to report a filtered measurement calculated in accordance with a network configured filter coefficient from a set of instantaneous measurement samples that can be captured over a measurement period that can be defined by the network.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with RAN 110. In embodiments, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network (CN) of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100

(e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN XR220 of FIG. XR2) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In embodiments where the system 100 is an LTE system (e.g., when CN 120 is an evolved packet core (EPC) XR120 as in FIG. XR1), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC XR220 as in FIG. XR2), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. XR2.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMES.

Figure 2:
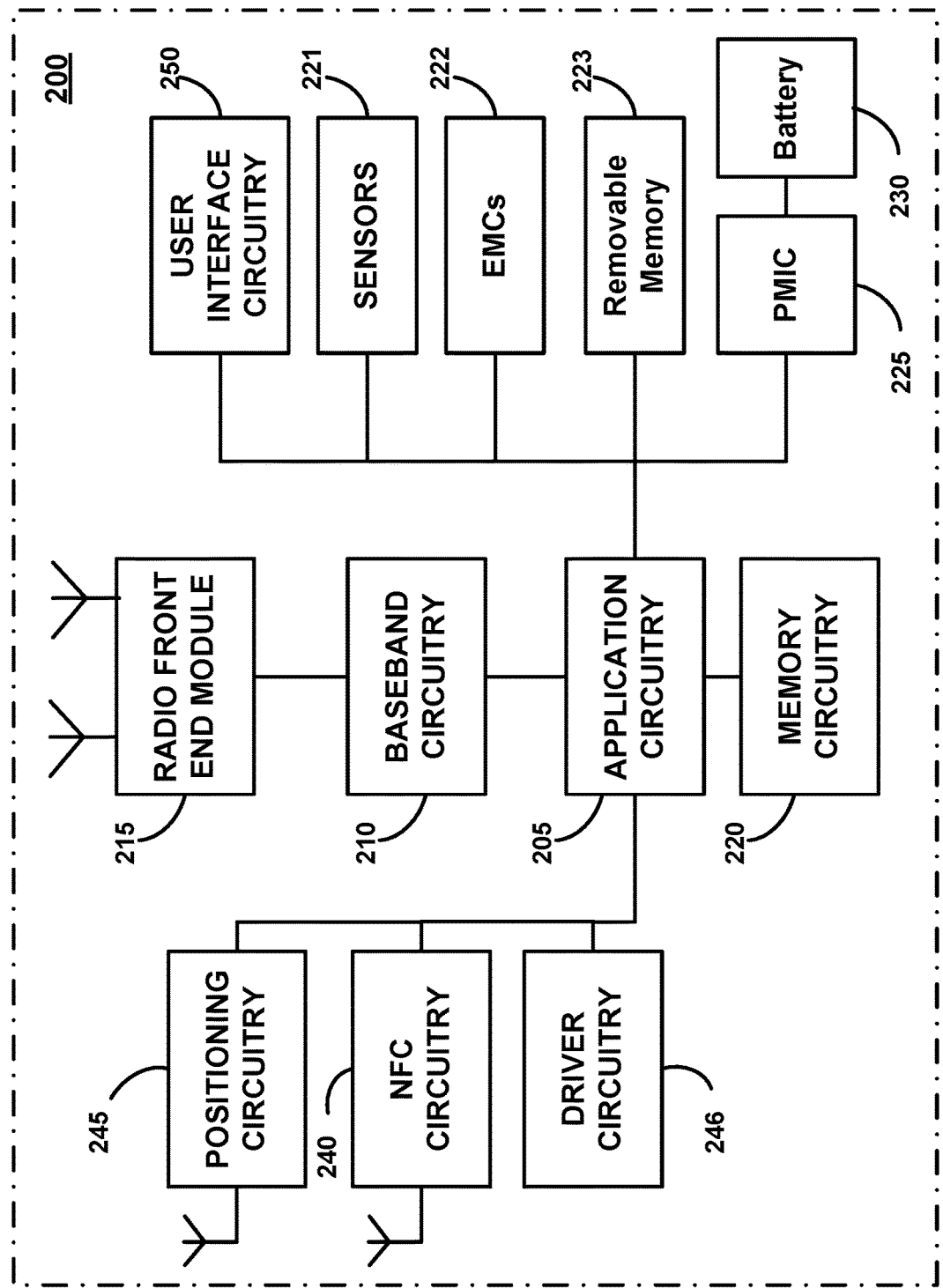
FIG. 2 illustrates an example of a platform (or "device") in accordance with various embodiments.

FIG. 2 illustrates an example of a platform 200 (or "device 200") in accordance with various embodiments. In embodiments, the computer platform 200 may be suitable for use as UEs 101, XR101, XR201, application servers 130, and/or any other element/device discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 205 may comprise, or may be, a special-purpose processor/controller to operate according to the various embodiments herein.

As examples, the processor(s) of application circuitry 205 may include an Apple A-series processor. The processors of the application circuitry 205 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 205 may comprise logic blocks or logic fabric, and other interconnected resources that may be programmed to perform various functions, such as the procedures, methods, functions, etc. Of the various embodiments discussed herein. In such embodiments, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 210 are discussed infra with regard to FIG. 3.

The RFEMs 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 311 of FIG. 3 infra), and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 220 may be developed in accordance with a Joint Electron Devices Engineering Council (JEDEC) low power double data rate (LPDDR)-based design, such as LPDDR2, LPDDR3, LPDDR4, or the like. Memory circuitry 220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 220 may be on-die memory or registers associated with the application circuitry 205. To provide for persistent storage of information such as data, applications, operating systems and so forth, memory circuitry 220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 200 may incorporate the three-dimensional (3D) cross-point (XPOINT) memories from Intel® and Micron®.

Removable memory circuitry 223 may include devices, circuitry, enclosures/housings, ports or receptacles, etc. Used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signaling to other components of the platform 200 to indicate a current state of the EMCs 222. Examples of the EMCs 222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 200 is configured to operate one or more EMCs 222 based on one or more captured events and/or instructions or control signals received from a service provider and/or various clients.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-PNT IC that uses a master timing clock to perform position tracking/estimation without GNSS assistance. The positioning circuitry 245 may also be part of, or interact with, the baseband circuitry and/or RFEMs 215 to communicate with the nodes and components of the positioning network. The positioning circuitry 245 may also provide position data and/or time data to the application circuitry 205, which may use the data to synchronize operations with various infrastructure (e.g., radio base stations), for turn-by-turn navigation applications, or the like In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint"). NFC circuitry 240 comprises an NFC controller coupled with an antenna element and a processor coupled with the NFC controller. The NFC controller may be a chip/IC providing NFC functionalities to the NFC circuitry 240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 240, or initiate data transfer between the NFC circuitry 240 and another active NFC device (e.g., a smartphone or an NFC-enabled POS terminal) that is proximate to the platform 200.

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200. For example, driver circuitry 246 may include a display driver to control and allow access to a display device, a touchscreen driver to control and allow access to a touchscreen interface of the platform 200, sensor drivers to obtain sensor readings of sensor circuitry 221 and control and allow access to sensor circuitry 221, EMC drivers to obtain actuator positions of the EMCs 222 and/or control and allow access to the EMCs 222, a camera driver to control and allow access to an embedded image capture device, audio drivers to control and allow access to one or more audio devices.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230, for example, when the device is included in a UE 101, XR101, XR201.

In some embodiments, the PMIC 225 may control, or otherwise be part of, various power saving mechanisms of the platform 200. For example, if the platform 200 is in an RRC_Connected state, where it is still connected to the RAN node as it expects to receive traffic shortly, then it may enter a state known as Discontinuous Reception Mode (DRX) after a period of inactivity. During this state, the platform 200 may power down for brief intervals of time and thus save power. If there is no data traffic activity for an extended period of time, then the platform 200 may transition off to an RRC_Idle state, where it disconnects from the network and does not perform operations such as channel quality feedback, handover, etc. The platform 200 goes into a very low power state and it performs paging where again it periodically wakes up to listen to the network and then powers down again. The platform 200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in V2X applications, the battery 230 may be a typical lead-acid automotive battery.

In some implementations, the battery 230 may be a "smart battery," which includes or is coupled with a Battery Management System (BMS) or battery monitoring integrated circuitry. The BMS may be included in the platform 200 to track the state of charge (SoCh) of the battery 230. The BMS may be used to monitor other parameters of the battery 230 to provide failure predictions, such as the state of health (SoH) and the state of function (SoF) of the battery 230. The BMS may communicate the information of the battery 230 to the application circuitry 205 or other components of the platform 200. The BMS may also include an analog-to-digital (ADC) convertor that allows the application circuitry 205 to directly monitor the voltage of the battery 230 or the current flow from the battery 230. The battery parameters may be used to determine actions that the platform 200 may perform, such as transmission frequency, network operation, sensing frequency, and the like.

A power block, or other power supply coupled to an electrical grid may be coupled with the BMS to charge the battery 230. In some examples, the battery 230 may be replaced with a wireless power receiver to obtain the power wirelessly, for example, through a loop antenna in the computer platform 200. In these examples, a wireless battery charging circuit may be included in the BMS. The specific charging circuits chosen may depend on the size of the battery 230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200. The user interface circuitry 250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 200. The output device circuitry may also include speakers or other audio emitting devices, printer(s), and/or the like. In some embodiments, the sensor circuitry 221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 3:
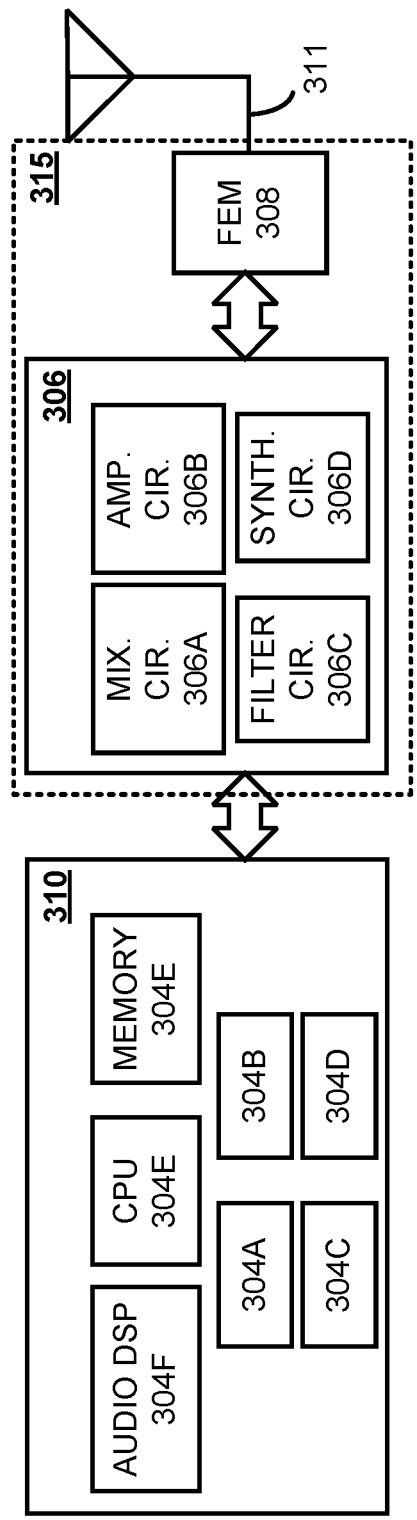
FIG. 3 illustrates example components of baseband circuitry and radio front end modules (RFEM) in accordance with various embodiments.

FIG. 3 illustrates example components of baseband circuitry 310 and radio front end modules (RFEM) 315 in accordance with various embodiments. The baseband circuitry 310 corresponds to the baseband circuitry 210 of FIG. 2, respectively. The RFEM 315 corresponds to the RFEM 215 of FIG. 2, respectively. As shown, the RFEMs 315 may include Radio Frequency (RF) circuitry 306, front-end module (FEM) circuitry 308, antenna array 311 coupled together at least as shown.

The baseband circuitry 310 includes circuitry and/or control logic configured to carry out various radio/network protocol and radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 310 may include Fast-Fourier Transform (FFT), precoding, or constellation mapping/demapping functionality. In some embodiments, encoding/decoding circuitry of the baseband circuitry 310 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 310 is configured to process baseband signals received from a receive signal path of the RF circuitry 306 and to generate baseband signals for a transmit signal path of the RF circuitry 306. The baseband circuitry 310 is configured to interface with application circuitry 205 (see FIG. 2) for generation and processing of the baseband signals and for controlling operations of the RF circuitry 306. The baseband circuitry 310 may handle various radio control functions.

The aforementioned circuitry and/or control logic of the baseband circuitry 310 may include one or more single or multi-core processors. For example, the one or more processors may include a 3G baseband processor 304A, a 4G/LTE baseband processor 304B, a 5G/NR baseband processor 304C, or some other baseband processor(s) 304D for other existing generations, generations in development or to be developed in the future (e.g., sixth generation (6G), etc.). In other embodiments, some or all of the functionality of baseband processors 304A-D may be included in modules stored in the memory 304G and executed via a Central Processing Unit (CPU) 304E. In other embodiments, some or all of the functionality of baseband processors 304A-D may be provided as hardware accelerators (e.g., FPGAs, ASICs, etc.) loaded with the appropriate bit streams or logic blocks stored in respective memory cells. In various embodiments, the memory 304G may store program code of a real-time OS (RTOS), which when executed by the CPU 304E (or other baseband processor), is to cause the CPU 304E (or other baseband processor) to manage resources of the baseband circuitry 310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 310 includes one or more audio digital signal processor(s) (DSP) 304F. The audio DSP(s) 304F include elements for compression/decompression and echo cancellation and may include other suitable processing elements in other embodiments.

In some embodiments, each of the processors 304A-304E include respective memory interfaces to send/receive data to/from the memory 304G. The baseband circuitry 310 may further include one or more interfaces to communicatively couple to other circuitries/devices, such as an interface to send/receive data to/from memory external to the baseband circuitry 310; an application circuitry interface to send/receive data to/from the application circuitry 205 of FIG. 2); an RF circuitry interface to send/receive data to/from RF circuitry 306 of FIG. 3; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 225.

In alternate embodiments (which may be combined with the above described embodiments), baseband circuitry 310 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (e.g., the radio front end modules 315).

Although not shown by FIG. 3, in some embodiments, the baseband circuitry 310 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 310 and/or RF circuitry 306 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 310 and/or RF circuitry 306 are part of a Wi-Fi communication system. In the second example, the protocol processing circuitry would operate Wi-Fi MAC and logical link control (LLC) functions. The protocol processing circuitry may include one or more memory structures (e.g., 304G) to store program code and data for operating the protocol functions, as well as one or more processing cores to execute the program code and perform various operations using the data. The baseband circuitry 310 may also support radio communications for more than one wireless protocol.

The various hardware elements of the baseband circuitry 310 discussed herein may be implemented, for example, as a solder-down substrate including one or more integrated circuits (ICs), a single packaged IC soldered to a main circuit board or a multi-chip module containing two or more ICs. In one example, the components of the baseband circuitry 310 may be suitably combined in a single chip or chipset, or disposed on a same circuit board. In another example, some or all of the constituent components of the baseband circuitry 310 and RF circuitry 306 may be implemented together such as, for example, a system on a chip (SoC) or System-in-Package (SiP). In another example, some or all of the constituent components of the baseband circuitry 310 may be implemented as a separate SoC that is communicatively coupled with and RF circuitry 306 (or multiple instances of RF circuitry 306). In yet another example, some or all of the constituent components of the baseband circuitry 310 and the application circuitry 205/205 may be implemented together as individual SoCs mounted to a same circuit board (e.g., a "multi-chip package").

In some embodiments, the baseband circuitry 310 may provide for communication compatible with one or more radio technologies. For example, in some embodiments, the baseband circuitry 310 may support communication with an E-UTRAN or other WMAN, a WLAN, a WPAN. Embodiments in which the baseband circuitry 310 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. To facilitate the communication with the wireless network. RF circuitry 306 may include a receive signal path, which may include circuitry to down-convert RF signals received from the FEM circuitry 308 and provide baseband signals to the baseband circuitry 310. RF circuitry 306 may also include a transmit signal path, which may include circuitry to up-convert baseband signals provided by the baseband circuitry 310 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 310 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 310 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 310 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 310 or the application circuitry 205/205 depending on the desired output frequency. In some embodiments, a divider control input (e.g., N) may be determined from a look-up table based on a channel indicated by the application circuitry 205/205.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path, which may include circuitry configured to operate on RF signals received from antenna array 311, amplify the received signals and provide the amplified versions of the received signals to the RF circuitry 306 for further processing. FEM circuitry 308 may also include a transmit signal path, which may include circuitry configured to amplify signals for transmission provided by the RF circuitry 306 for transmission by one or more of antenna elements of antenna array 311. In various embodiments, the amplification through the transmit or receive signal paths may be done solely in the RF circuitry 306, solely in the FEM circuitry 308, or in both the RF circuitry 306 and the FEM circuitry 308.

In some embodiments, the FEM circuitry 308 may include a TX/RX switch to switch between transmit mode and receive mode operation. The FEM circuitry 308 may include a receive signal path and a transmit signal path. The receive signal path of the FEM circuitry 308 may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission by one or more antenna elements of the antenna array 311.

The antenna array 311 comprises one or more antenna elements, each of which is configured convert electrical signals into radio waves to travel through the air and to convert received radio waves into electrical signals. For example, digital baseband signals provided by the baseband circuitry 310 is converted into analog RF signals (e.g., modulated waveform) that will be amplified and transmitted via the antenna elements of the antenna array 311 including one or more antenna elements (not shown). The antenna elements may be omnidirectional, direction, or a combination thereof. The antenna elements may be formed in a multitude of arranges as are known and/or discussed herein. The antenna array 311 may comprise microstrip antennas or printed antennas that are fabricated on the surface of one or more printed circuit boards. The antenna array 311 may be formed in as a patch of metal foil (e.g., a patch antenna) in a variety of shapes, and may be coupled with the RF circuitry 306 and/or FEM circuitry 308 using metal transmission lines or the like.

Processors of the application circuitry 205/205 and processors of the baseband circuitry 310 may be used to execute elements of one or more instances of a protocol stack. For example, processors of the baseband circuitry 310, alone or in combination, may be used execute Layer 3, Layer 2, or Layer 1 functionality, while processors of the application circuitry 205/205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

The wireless communication device can be configured to take measurements at least once in a measurement period that can be defined by the network and the wireless communication device can be configured to filter the measurements according to a network configured filter coefficient. The network configured filter coefficient can be signaled to the wireless communication device by the serving base station in radio resource control (RRC) reconfiguration signaling.

The sampling rate at which a wireless communication device captures instantaneous measurement samples can be left up to the device, and can vary by implementation. As an example, a wireless communication device operating on an LTE network can capture RSRP and/or RSRQ measurement samples every 40 milliseconds (ms) and can filter measurement samples over a measurement period, such as a 200 ms measurement period. While the network configured filter coefficient can provide stability in measurements and avoid unnecessarily triggering a handover due to a single instantaneous measurement sample that may be an aberration, a filtered measurement can lag behind instantaneous measurements in fast fading channel conditions to an extent to which event reporting and handover may be delayed to the detriment of an ongoing call, which may be dropped as a result of the delay.

Figure 4:
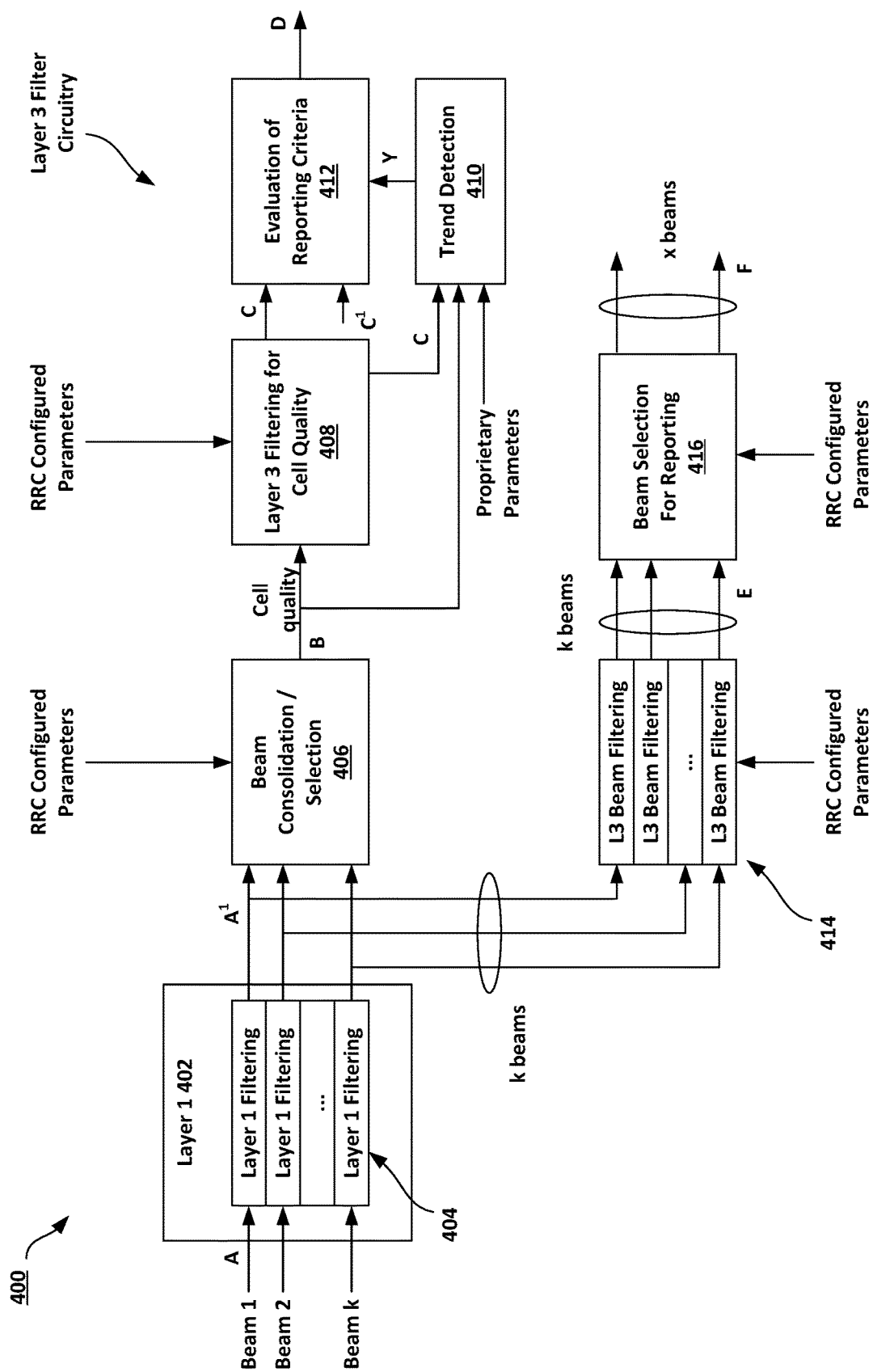
FIG. 4 is a schematic diagram of a measurement model for a user equipment.

FIG. 4 is a schematic diagram of a measurement model 400 for a user equipment. In RRC_CONNECTED, the UE measures multiple beams (at least one) of a cell and the measurements results (power values) are averaged to derive the cell quality. In doing so, the UE is configured to consider a subset of the detected beams. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the base station.

The corresponding high-level measurement model is described in FIG. 4.

Layer 1 (L1) logic 402 input are k beams, which correspond to the measurements on synchronization signal block (SSB) or channel state information reference signal (CSI-RS) resources configured for Layer 3 (L3) mobility by a base station and detected by UE at L1.

A represents a point at which measurements (beam specific samples) internal to the physical layer are input to L1 filtering logic 404. L1 filtering logic 404 corresponds to internal L1 filtering of the inputs measured at point A. Exact filtering is implementation dependent. How the measurements are actually executed in the physical layer by an implementation (inputs A and L1 1 filtering logic 404) is not constrained by this application.

At the output of L1 filtering logic 404 are A1, which are measurements (i.e. beam specific measurements) reported by L1 to L3 after L1 filtering logic 404.

The A1 measurements are input into beam consolidation/ selection logic 406. Beam consolidation/selection logic 406 can perform operations on beam specific measurements to consolidate the measurements to derive cell quality. The behavior of the beam consolidation/selection logic 406 is standardized and the configuration of this module is provided by RRC signaling (RRC configured parameters). Reporting period at B equals one measurement period at A1.

The output of beam consolidation/selection logic 406 is at point B, which are measurements of cell quality derived from beam-specific measurements reported to L3. Measurements B are input into Layer 3 filtering for cell quality logic 408 and into Trend Layer 3 filtering for cell quality logic 408 performs filtering on the measurements provided at point B. The L3 filtering for cell quality logic 408 includes an RRC configured filter (or set of filters). The behavior of the L3 filtering for cell quality logic 408 is standardized and the configuration of the L3 filters is provided by RRC signaling (e.g., RRC configured parameters). Filtering reporting period at C equals one measurement period at B. The output of the L3 is a measurement after processing in the L3 filter, designated as Point C. The reporting rate at point C is identical to the reporting rate at point B. This measurements C are used as input for one or more evaluation of reporting criteria into evaluation of reporting criteria logic 412. Measurements C are also used as an input for trend detection logic 410.

Trend detection logic 410 can include additional logical elements to perform additional signal processing on measurements B to reduce the likelihood of errant TTT or measurement report timer resets. FIGS. 5A-5D illustrate example embodiments of trend detection logic 410. The output of trend detection logic 410 is measurement Y, which is input to evaluation of reporting criteria logic 412.

Evaluation of reporting criteria logic 412 checks whether actual measurement reporting is necessary at point D. The evaluation can be based on more than one flow of measurements C and Y, e.g. to compare between different measurements. This is illustrated by input C and C1 and Y. The UE shall evaluate the reporting criteria at least every time a new measurement result is reported at point C, C1. The reporting criteria are standardized and the configuration is provided by RRC signaling (UE measurements). In some embodiments, the evaluation and reporting criteria logic 412 can receive information that can inform the determination of whether to sustain or reset the TTT or measurement report timer. For example, depending on trend information about the signal, the evaluation of reporting criteria logic 412 can make a determination to sustain a TTT or to reset the TTT.

Point D represents measurement report information (message) sent on the radio interface.

Also shown in FIG. 4 at point A1 is L3 beam filtering logic 414. L3 beam filtering logic 414 is performed on the measurements (i.e. beam specific measurements) provided at point A1. The behavior of the beam filters is standardized and the configuration of the beam filters is provided by RRC signaling. Filtering reporting period at E equals one measurement period at A1. Point E represents a measurement (i.e. beam-specific measurement) after processing in the L3 beam filtering logic 414. The reporting rate is identical to the reporting rate at point A1. This measurement E is used as input for selecting the x measurements to be reported.

Beam selection for beam reporting 416 selects the x measurements from the measurements provided at point E. The behavior of the beam selection is standardized and the configuration of this module is provided by RRC signaling. Point F represents beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in TS 38.133. Layer 3 filtering for cell quality and related parameters used are specified in TS 38.331 and do not introduce any delay in the sample availability between B and C. Measurement at point C, C1 is the input used in the event evaluation. L3 Beam filtering and related parameters used are specified in TS 38.331 and do not introduce any delay in the sample availability between E and F.

Measurement reports are characterized by the following:

Measurement reports include the measurement identity of the associated measurement configuration that triggered the reporting: Cell and beam measurement quantities to be included in measurement reports are configured by the network; The number of non-serving cells to be reported can be limited through configuration by the network; Cells belonging to a no-go configured by the network are not used in event evaluation and reporting, and conversely when a go is configured by the network, only the cells belonging to the go are used in event evaluation and reporting; and Beam measurements to be included in measurement reports are configured by the network (beam identifier only, measurement result and beam identifier, or no beam reporting).

In embodiments, the Layer 3 filtering circuitry can be augmented to add additional features to control the measurement report timer. FIGS. 5A-5D illustrate various example embodiments of Layer 3 filtering circuitry in accordance with embodiments of the present disclosure.

Figure 5A:
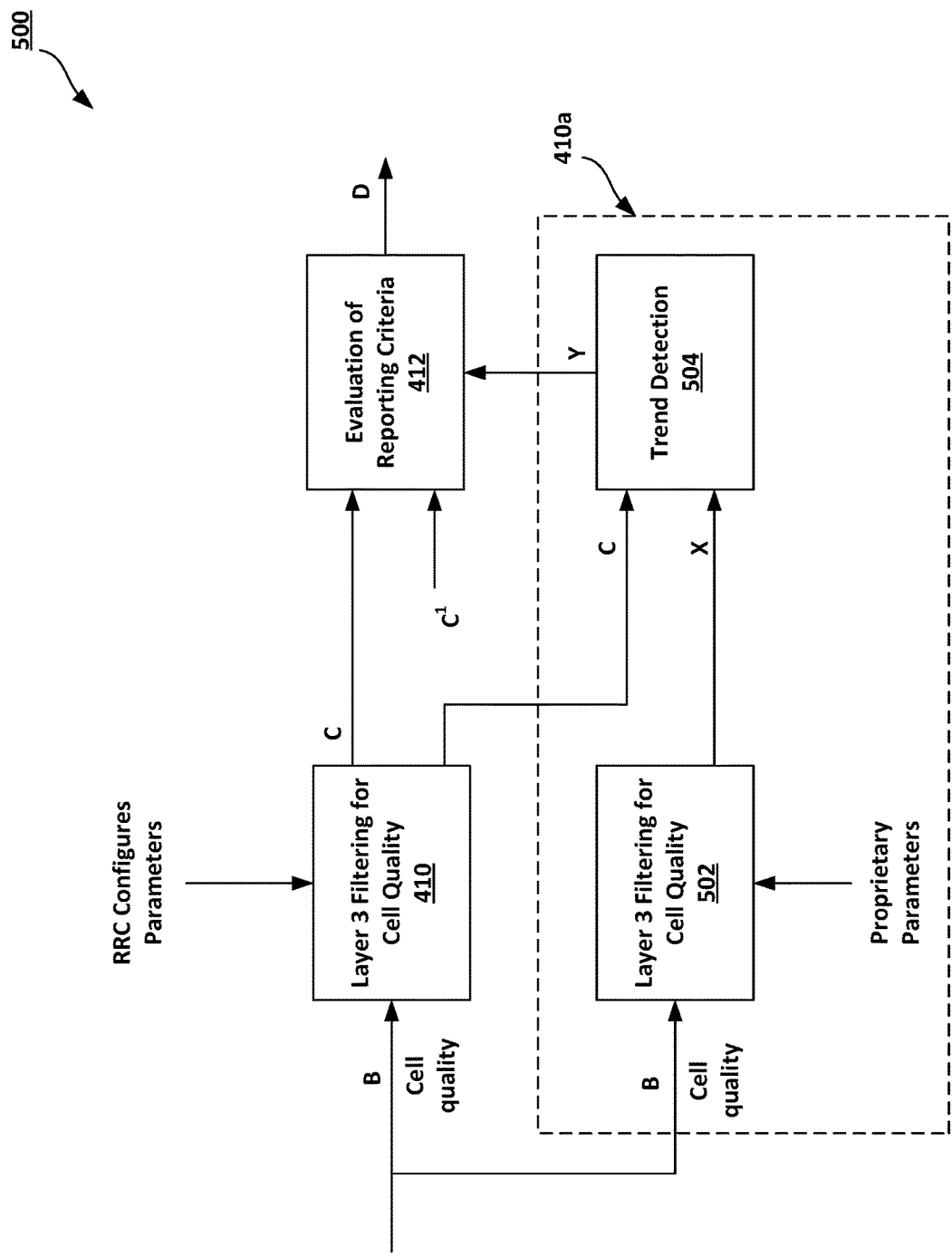
FIG. 5A is a schematic diagram of an example filtering circuitry for peak filtering using additional layer 3 filtering in accordance with embodiments of the present disclosure.

FIG. 5A is a schematic diagram of an example layer 3 (L3) filtering circuitry 500 for peak filtering using additional layer 3 filtering in accordance with embodiments of the present disclosure. The L3 filtering circuitry 500 includes a first L3 filtering circuit 410 (which was described in FIG. 4 as L3 filtering for cell quality 410) that uses RRC configured parameters. The L3 filtering circuitry 500 also includes a second L3 filtering circuit 502 that uses proprietary parameters. Both filters operate on a signal from Point B but use different parameters, such as different filtering coefficients. For example, the first L3 filtering circuit 410 can use filtering coefficients provided by the network and that are configured by RRC signaling. The second L3 filtering circuit 502 can use filtering coefficients that are selected based on RF conditions, such as Doppler frequency when the TTT was set (to account for the mobility of the UE), operating RSRP, operating signal level, measurement object (e.g. path loss, RSRQ, beam measurements etc. can have different secondary filter coefficients in similar radio conditions, etc.), or other sensor information such as motion or orientation. The embodiment shown in FIG. 5A shows a single "second" filtering circuit, but more than two L3 filtering circuits that use proprietary parameters can also be used to further filter the received signal. The output of the second L3 filtering circuit 502 is shown as X in FIG. 5A.

Generally, the proprietary parameter can include a filtering coefficient that has slower characteristics than the RRC configured filtering coefficient. For example, the proprietary parameter (or second parameter) can include a filter coefficient that causes the second filter 502 to be slower than the first filter 410, and therefore results in a signal value that shows a longer-term trend than the first filter 410.

As another example, the second parameter can have a higher weighted history than the first parameter. In the 3GPP-specific example, the second L3 filtering 502 can be configured with a filter coefficient that is higher than the filter coefficient for the first L3 filtering 410. Higher in this example means "higher weighted history."

The second filtered signal X is based on a slower filter, a higher weighted history, or a higher 3GPP L3 filter coefficient to make the second filtered signal X follow the overall trend more vs. the first filtered signal C.

$$Fn=(1-a)*Fn-1+a*Mn$$

$a=\frac{1}{2}(ki/4)$, where ki is the filter coefficient

In an example, a 3GPP L3 filter coefficient set by the network can be 4, which means the measured history is weighted 50% vs the current measurement result. For the proprietary value, a higher filter coefficient would be used. For example:

FilterCoefficient::=ENUMERATED {fc0, fc1, fc2, fc3, fc4, fc5, fc6, fc7, fc8, fc9, fc11, fc13, fc15, fc17, fc19, spare1, . . . }—TAG-FILTERCOEFFICIENT-STOP.

The output of both the first L3 filtering circuit 410 (C) and the second L3 filtering circuit 502 (X) can be used as inputs to a trend detection circuit 504. The trend detection circuitry outputs a trend (Y) based on a convergence of the two (or more) filtered values. As an example, a declining trend in signal quality can be determined if C and X are both declining or if C≤X (±a threshold value around X). When a declining trend is detected, spikes above a threshold value for resetting TTT can be ignored and the TTT can be sustained. An increasing trend in signal quality can be determined if C and X are both increasing or if C≥X (±a threshold value around X). When an increasing trend is detected, spikes above a threshold value for resetting TTT can be used to preemptively cancel TTT before waiting for the expiration of the TTT duration.

If C and X are crossing or have crossed within a certain window, the signal can be determined to be unstable or turning. The stability of the trend (Y) can be derived from a distance between C and X. E.g., a bigger distance between C and X suggests that the signal is more stable.

In slow moving/steady conditions, the trends might be more stable than in fast moving conditions. The device might quickly move around a corner or some other edge case scenario could occur. The stability information can accompany the trend detection to further guide in the TTT sustain/reset or activate/deactivate decisions. In some embodiments, stability of the signal can also be used to dynamically adjust the proprietary parameters, such as the second filter coefficient.

In some embodiments, FIG. 5A illustrates the use of a parallel simple single pole infinite impulse responsive (IIR) high-pass filter when a measurement quantity is configured. A high-pass filter pursues the details (i.e. fluctuations) of the samples. Trace the outcomes of the filter.

The filter can be characterized by the following:

$$y\_k=(1-a)y\_(k-1)-ax\_k$$

where, the value of a is a proprietary parameter for the parallel (second) L3 filter.

The trend detection circuitry 504 can derive a spike detection threshold based on a function of values of y_k (e.g., mean of past few samples). The trend detection circuitry can use both L3 filtered signals to discount any outlier spikes based on that threshold to reset the TTT, even though L3 filtered value would otherwise cause the reset of the TTT.

Figure 5B:
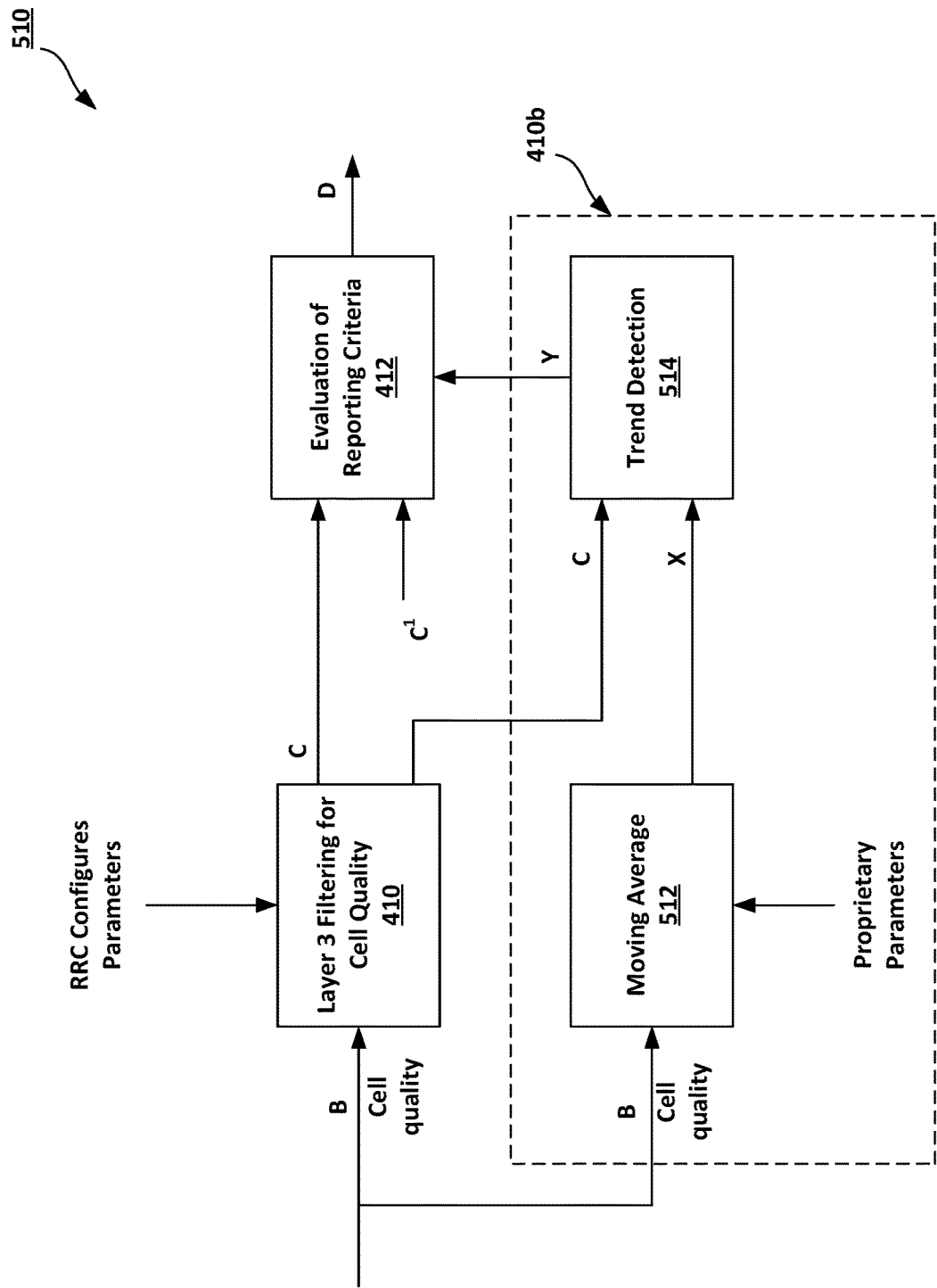
FIG. 5B is a schematic diagram of an example filtering circuit for peak filtering using a moving average in accordance with embodiments of the present disclosure.

FIG. 5B is a schematic diagram of an example L3 filtering circuit 510 for peak filtering using a moving average in accordance with embodiments of the present disclosure. The L3 filtering circuitry 500 includes a first L3 filtering circuit 410 (which was described in FIG. 4 as L3 filtering for cell quality 410) that uses RRC configured parameters. The L3 filtering circuit 510 also includes a moving averaging circuitry 512. The moving averaging circuitry 512 can calculate "n" moving averages of "m" instantaneous measurements of signal B. The signal X is output from the moving average circuitry 512 and input to the trend detection circuitry 514. X represents the filtered value of B based on the moving average calculation performed by the moving averaging circuitry 512.

The trend detection circuitry 514 can detect a trend Y based on a convergence of 2 or more filtered average values. For example, trend detection circuitry 514 can detect a declining trend of signal quality if C and X are both declining. In some embodiments, a threshold value around X can be determined, and a declining trend can be detected if C≤X (±the threshold value around X). When a declining trend is detected, spikes above a threshold value for resetting TTT can be ignored and the TTT can be sustained.

An increasing trend in signal quality can be determined if C and X are both increasing or if C≥X (±a threshold value around X). When an increasing trend is detected, spikes above a threshold value for resetting TTT can be used to preemptively cancel TTT before waiting for the expiration of the TTT duration.

If C and X are crossing or have crossed within a certain window, the signal can be determined to be unstable or turning. The stability of the trend (Y) can be derived from a distance between C and X. E.g., a bigger distance between C and X suggests that the signal is more stable.

The moving average circuitry 512 can use proprietary parameters to calculate the moving average. The parameters for the moving average calculation can be selected in a similar manner as discussed above. The proprietary parameters here can be, but not necessarily limited to, (i) Doppler, (ii) Measurement subject (i.e. whether it's RSRP, RSRQ, SNR, Pathloss, Beam measurements of FR1, FR2 etc.), (iii) Operating values of the measurement subject, (iv) sensor information like motion, orientations of the UE, among other things.

Figure 5C:
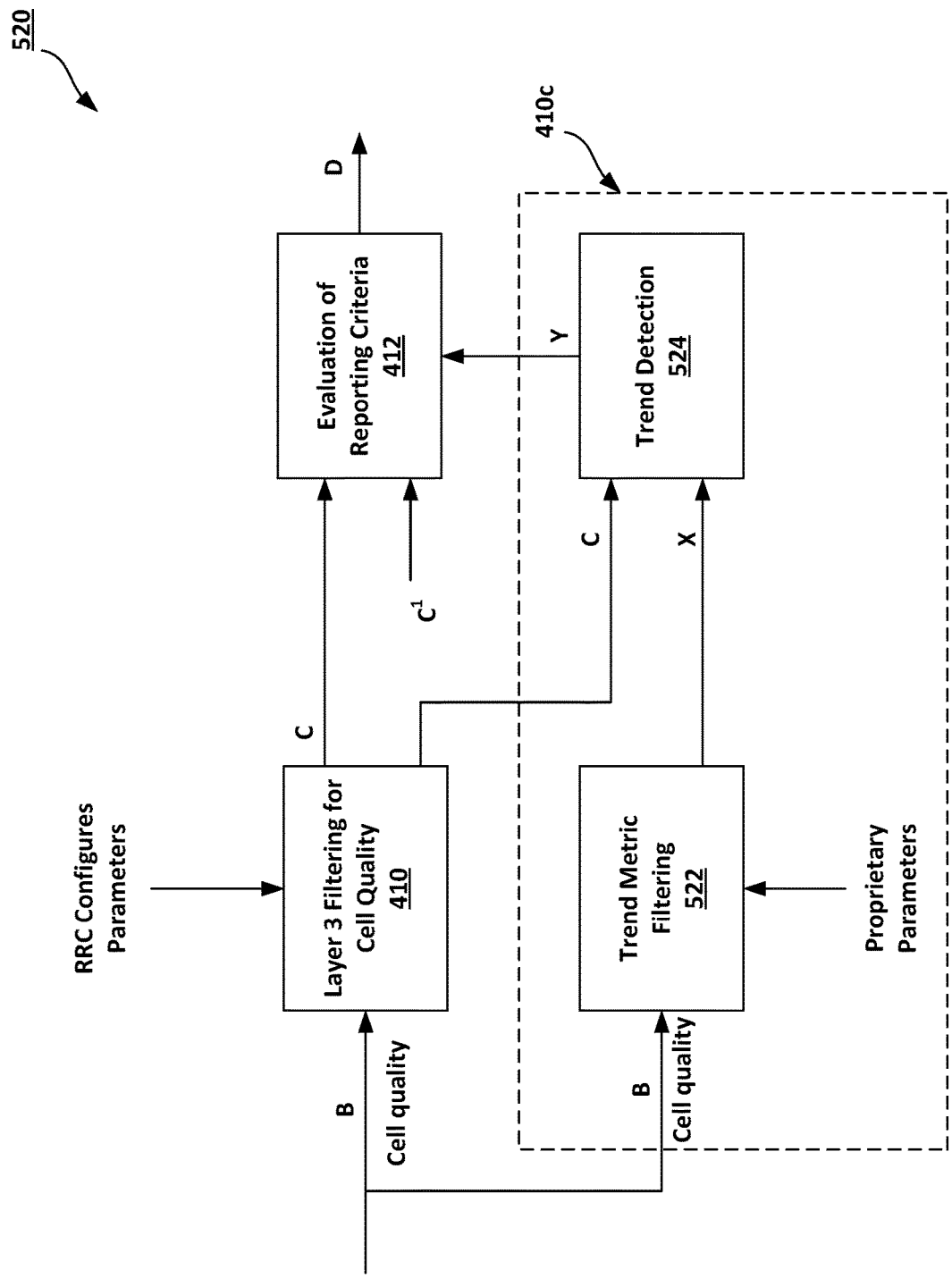
FIG. 5C is a schematic diagram of an example filtering circuit for early time-to-trigger cancelation in accordance with embodiments of the present disclosure.

FIG. 5C is a schematic diagram of an example filtering circuit for early time-to-trigger cancelation in accordance with embodiments of the present disclosure. The L3 filtering circuitry 500 includes a first L3 filtering circuit 410 (which was described in FIG. 4 as L3 filtering for cell quality 410) that uses RRC configured parameters. The L3 filtering circuit 510 also includes a trend metric filtering circuitry 524. While TTT timer is running the UE monitors a trend (Y) based on convergence of the 2 (or more) filtered values (see FIGS. 5A-B). Trend metric filtering circuitry 524 can include one or more L3 filters that use proprietary parameters, as described above. If the trend Y is increasing and a certain threshold (T1) is reached and/or the TTT is close to expire (T2), the evaluation of reporting criteria circuitry 412 may cancel or prolong the running TTT in order to avoid an unnecessary Measurement Reports being sent and/or handover followed by that measurement report.

T1 could be defined based on the threshold that started TTT (±)

T2 could be defined based on the TTT itself (±)

Figure 5D:
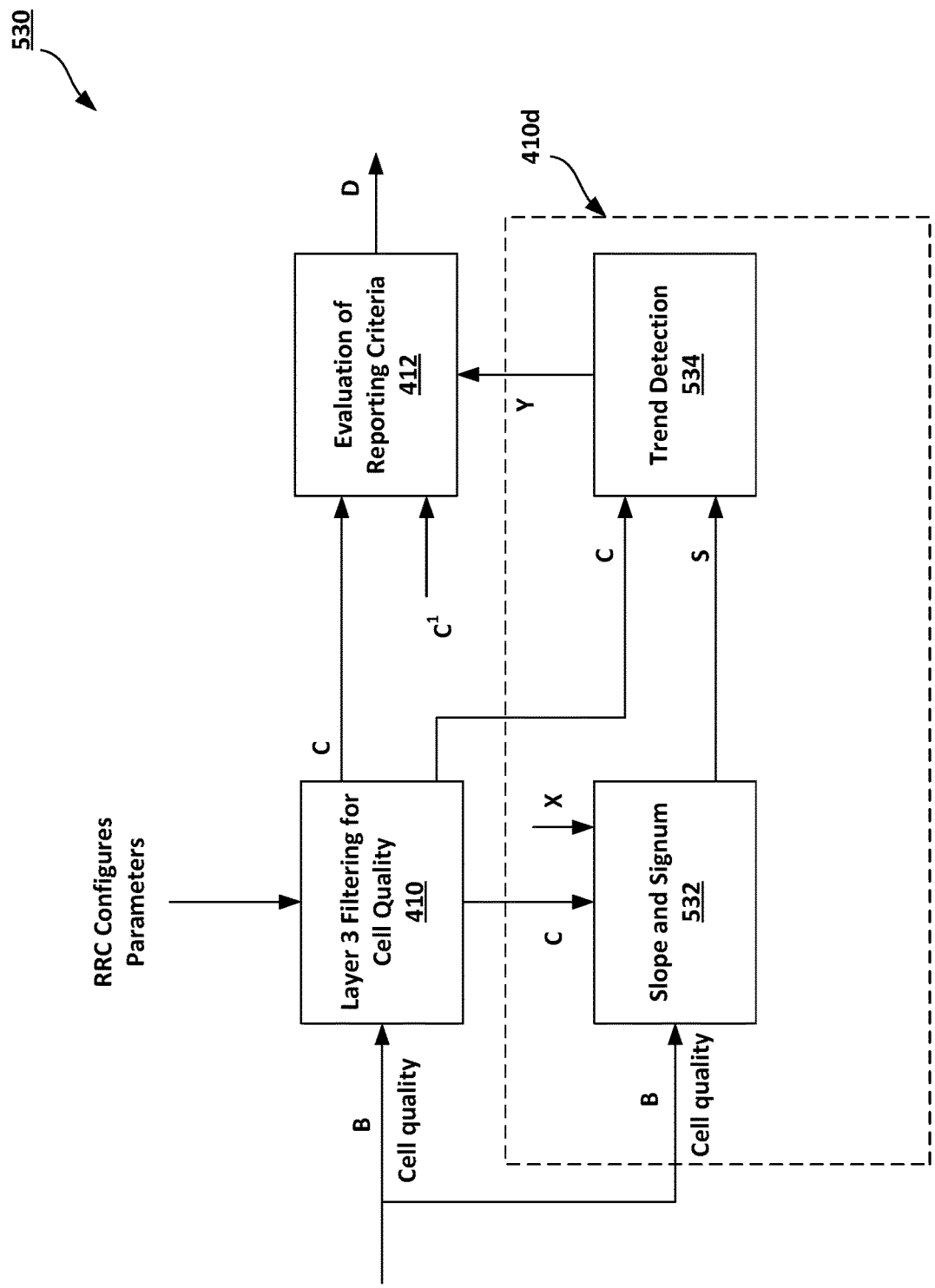
FIG. 5D is a schematic diagram of an example filtering circuit that uses slope and Signum calculations for measurement report timer control in accordance with embodiments of the present disclosure.

The advantages of early TTT cancellation include less signaling, which takes less power consumption, fewer unnecessary handovers, which also uses less power consumption, less error probability, no service interruption time for the user, and better/more stable data connection FIG. 5D is a schematic diagram of an example filtering circuit that uses slope and Signum calculations for measurement report timer control in accordance with embodiments of the present disclosure. In some embodiments, the signal B can be input into a slope and Signum function logic 532. Slope and Signum logic 532 can perform operations on the signal B to create a quantized representation of the signal B.

At each sample, the slope and Signum logic 532 computes a slope of the signal B using the previous sample. The signal used can be either the observed signal B or L3 filtered signal C or X (where X is a filtered signal as described above). The slope and Signum logic 532 can quantize the slope with a Signum function. An example of a quantized filtered signal is shown in FIG. 13.

Figure 13:
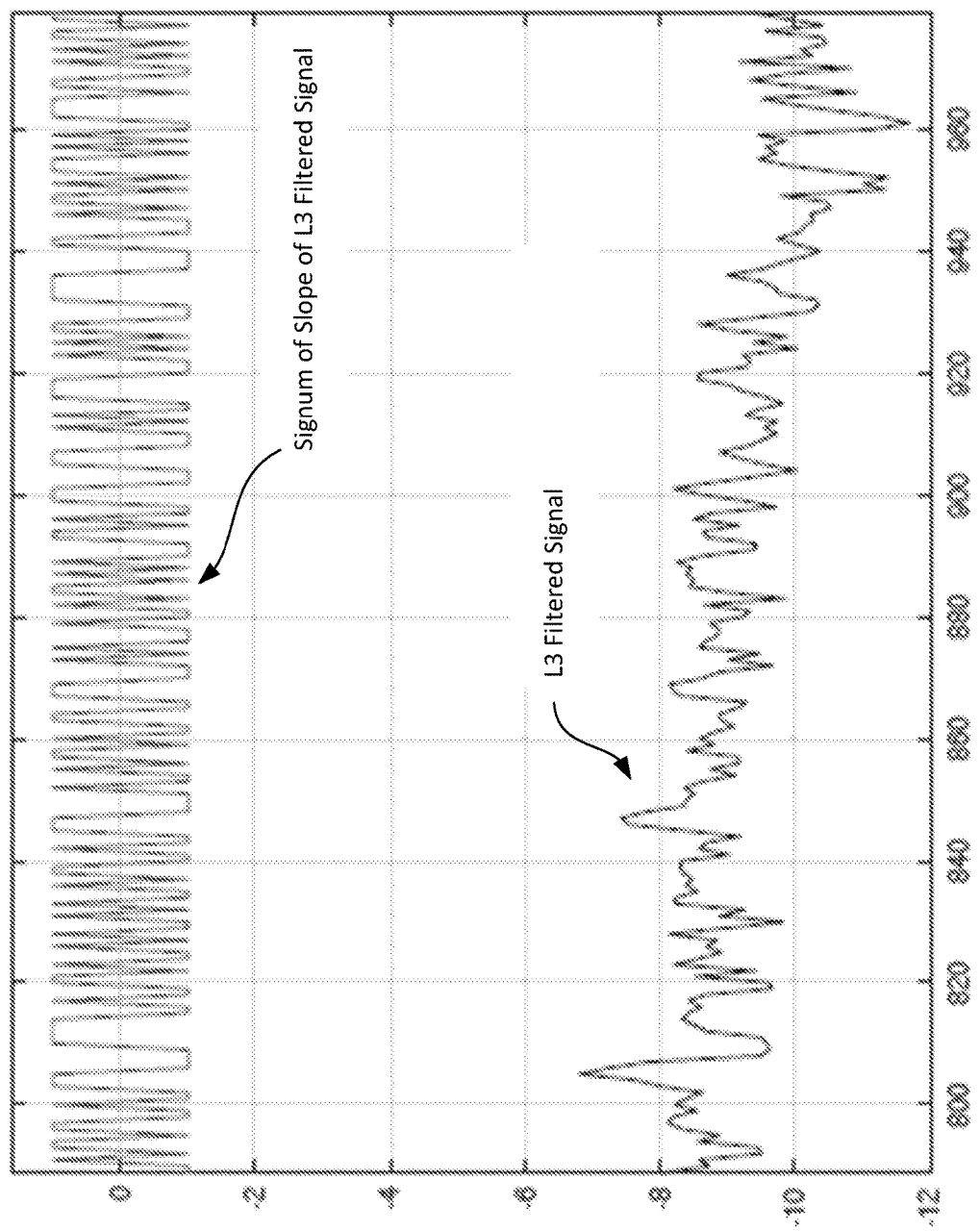
FIG. 13 is a diagram of an example of a quantized filtered signal using a slope and Signum logic in accordance with embodiments of the present disclosure.

FIG. 13 is a diagram 1300 of an example of a quantized filtered signal using a slope and Signum logic in accordance with embodiments of the present disclosure. If the slope at the nth sample is sn, and function value is fn, $$fn = \begin{cases} +1, & \text{if } sn > 0 \\ 0, & \text{if } sn = 0 \\ -1, & \text{if } sn < 0 \end{cases}$$

The trend detection circuitry can 543 can keeps track of cumulative sum of fn, cum(fn), for a set of most recent samples of size x. If a TTT resetting sample appears with L3 filtered values, if cum(fn) exceeds a threshold value, the evaluation of reporting criteria logic 412 can reset the TTT. Otherwise, the evaluation of reporting criteria logic 412 can disregard the sample and sustain the TTT.

The use of a slope and Signum logic facilitates a reliable detection of a true signal uptrend. In certain scenarios, such as in memory-less, independent fading, or steady-state situations, it is equally likely that a current sample is weaker or stronger than a previous sample. By performing slope and Signum calculations on q consecutive samples, and rely on the slope and Signum calculations for resetting or sustaining the TTT, the probability that a spike is due to noise is reduced by $(\frac{1}{2})^q$, where q is an integer, such as 2, 3, etc. Thus the evaluation of reporting criteria logic 412 can check if the contending spike is due to true uptrends in signal quality.

Figure 6:
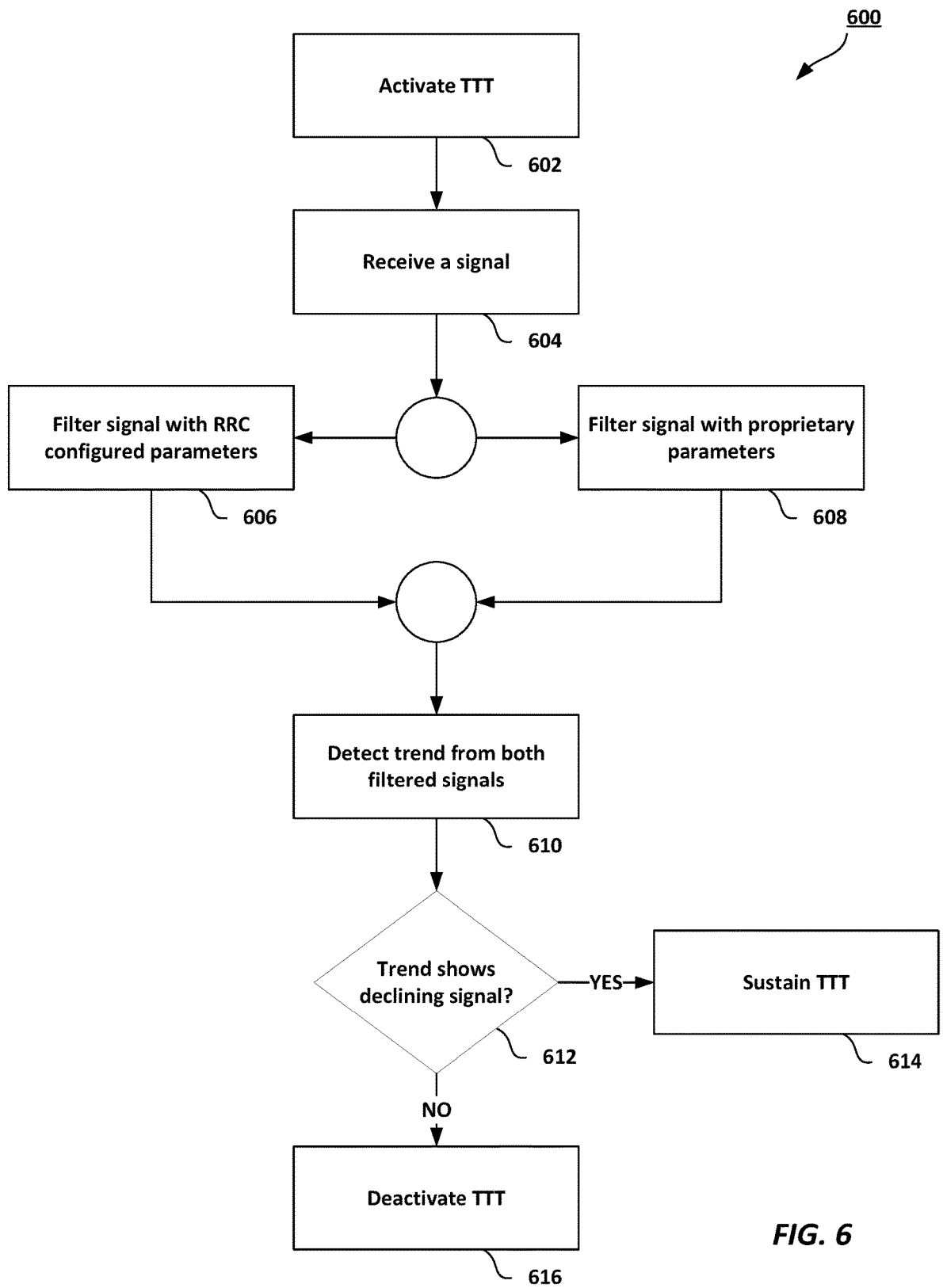
FIG. 6 is a process flow diagram for peak filtering using additional layer 3 filtering in accordance with embodiments of the present disclosure.

FIG. 6 is a process flow diagram 600 for peak filtering using additional layer 3 filtering in accordance with embodiments of the present disclosure. At the outset a time-to-trigger (TTT) or other type of measurement report timer has been activated (602). Such a timer can be activated due to a signal falling below a threshold value. The process operates on a continuous signal (604). The signal can undergo parallel L3 filtering, by a first L3 filter using RRC configured parameters (606) and by a second L3 filter using proprietary parameters (more than two filters can be used in parallel) (608). Both first and second filtered signals are provided to a trend detection logic that can determine whether the filtered signals represent a declining signal quality, an increasing signal quality, or an unstable signal quality. If the trend shows a declining signal quality (612), the timer is sustained (614). If the trend shows an increasing signal quality (612), the timer can be terminated to avoid an unnecessary measurement report transmission in anticipation of handover (616).

Figure 7:
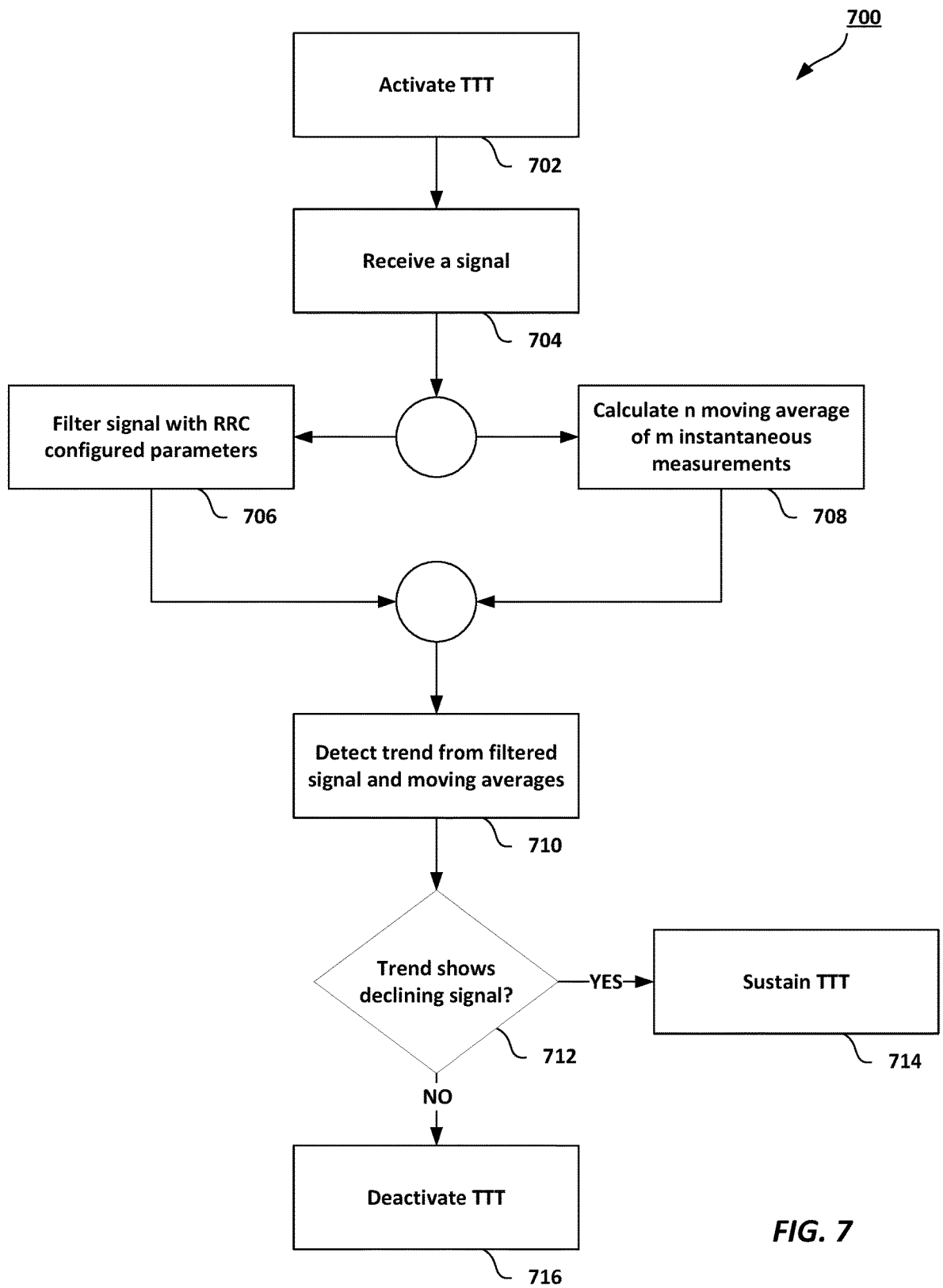
FIG. 7 is a process flow diagram for peak filtering using a moving average in accordance with embodiments of the present disclosure.

FIG. 7 is a process flow diagram 700 for peak filtering using a moving average in accordance with embodiments of the present disclosure. At the outset a time-to-trigger (TTT) or other type of measurement report timer has been activated (702). Such a timer can be activated due to a signal falling below a threshold value. The process operates on a continuous signal (704). In one parallel branch of processing, the signal can undergo L3 filtering using RRC configured parameters (706). In another parallel branch of processing, the signal can undergo a filter that performs a moving averages operation to filter the signal (708). The moving averages operation can calculate n moving averages of m instantaneous signal measurements using proprietary parameters (708). The parallel processed signals are input into a trend detection logic that detects a trend from the filtered signals and averages (710). If the trend shows a decline in signal quality (712), then the TTT can be sustained (714). If the trend shows an increase in signal quality (712), the TTT can be deactivated (716).

Figure 8:
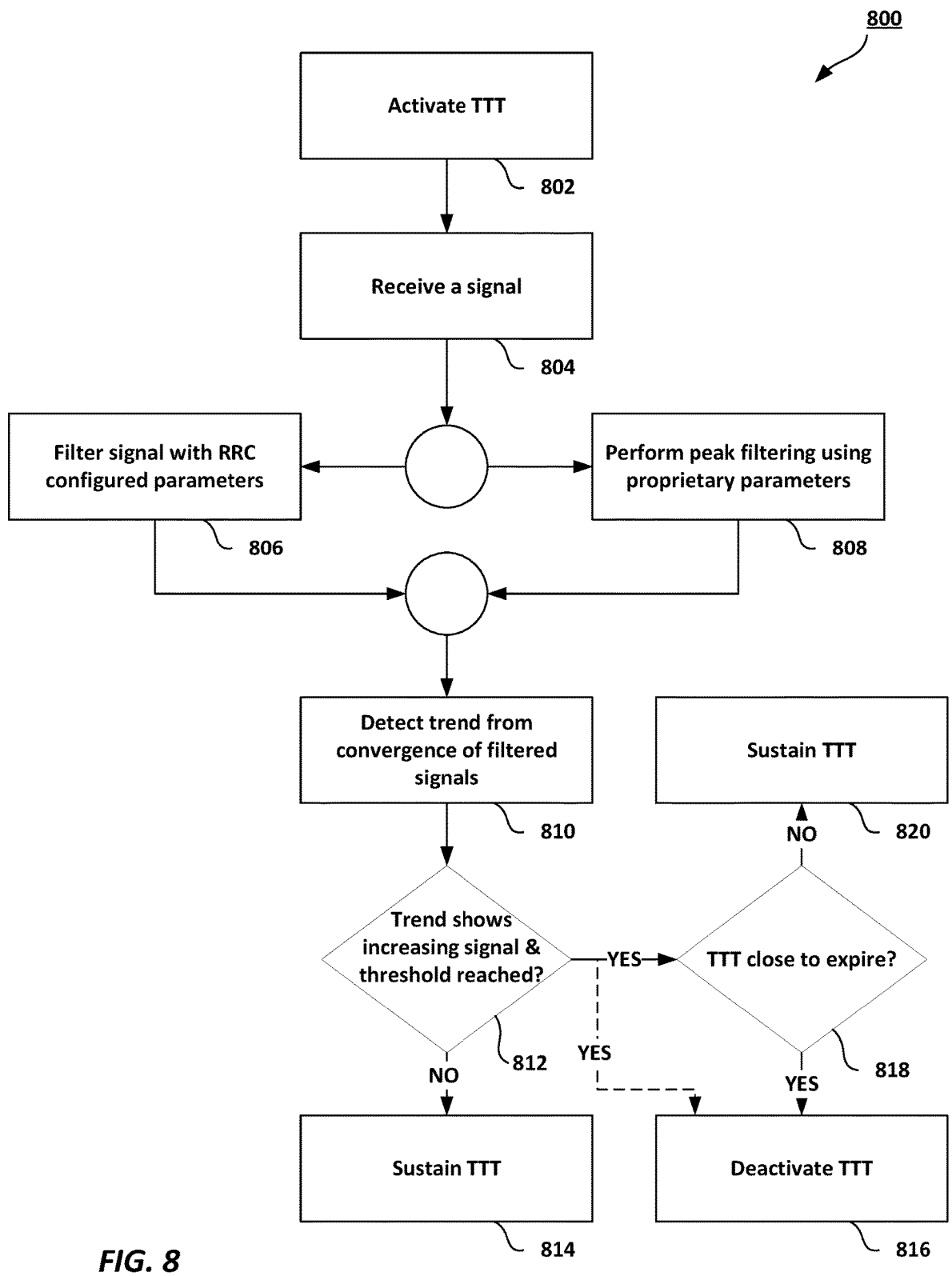
FIG. 8 is a process flow diagram for early time-to-trigger cancelation in accordance with embodiments of the present disclosure

FIG. 8 is a process flow diagram 800 for early time-to-trigger cancelation in accordance with embodiments of the present disclosure. At the outset a time-to-trigger (TTT) or other type of measurement report timer has been activated (802). Such a timer can be activated due to a signal falling below a threshold value. The process operates on a continuous signal (804). The signal can be filtered in parallel, using a first L3 filter using RRC configured parameters (806) and a peak filtering process using proprietary parameters (808). The peak filtering process can include a second L3 filtering such as that described in FIG. 6 or a moving averages process such as that described in FIG. 7 or other process. The parallel signals can be fed into a trend detection logic. If the trend is increasing and a certain threshold is reached (812), it can be determined whether the TTT is close to expire (818). IF the TTT is close to expiring, the UE may cancel or prolong the running TTT in order to avoid an unnecessary Measurement Report and/or HO followed by that (816). If the TTT is not close to expiring, the UE can sustain the TTT (820).

In some embodiments, after it is determined that the trend is increasing and a certain threshold is reached, the UE can elect to deactivate the TTT (816). Otherwise, the UE can sustain the TTT (814) This can be done without consideration of the remaining duration of the timer.

Figure 9:
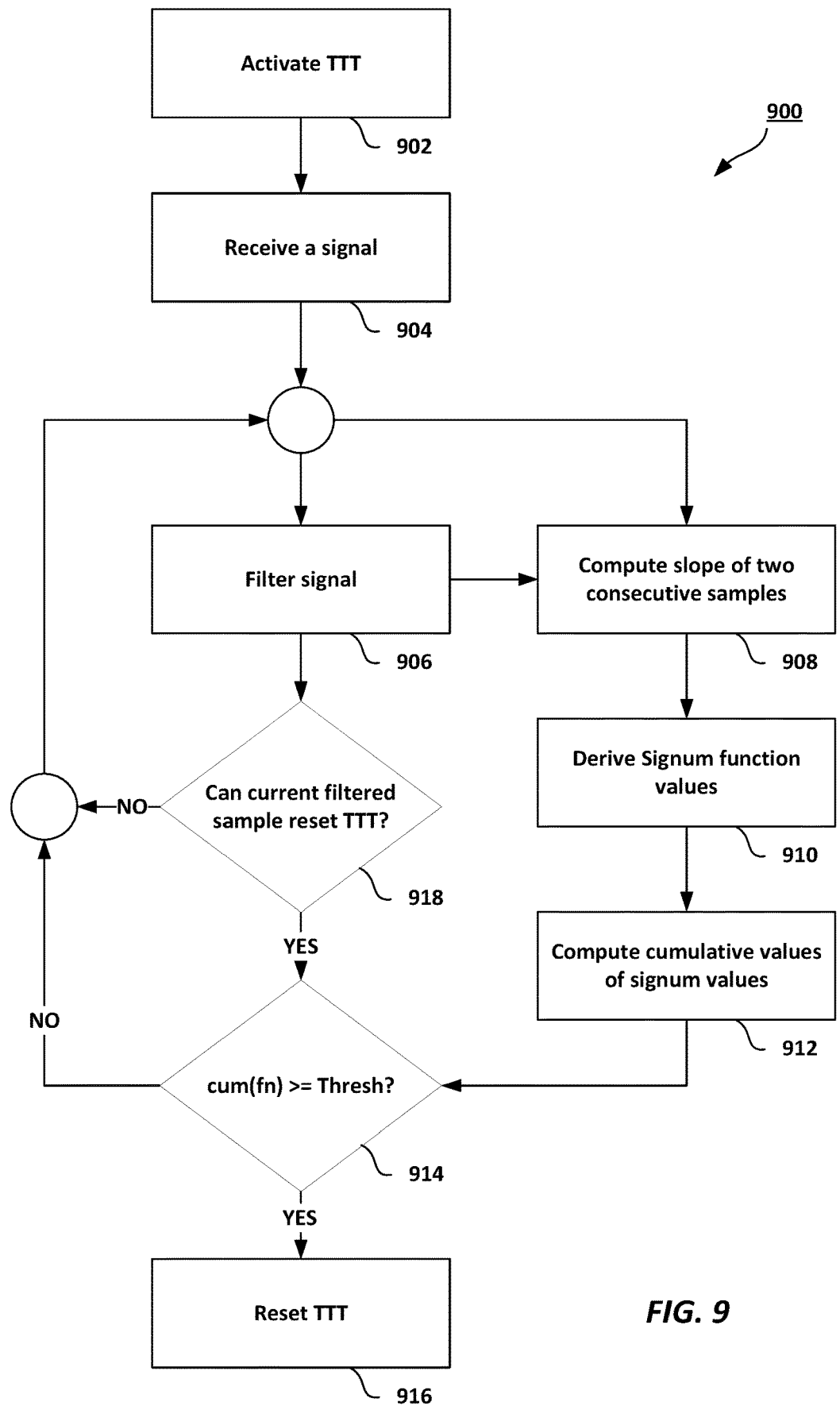
FIG. 9 is a process flow diagram for slope and Signum calculations for measurement report timer control in accordance with embodiments of the present disclosure.

FIG. 9 is a process flow diagram 900 for slope and Signum calculations for measurement report timer control in accordance with embodiments of the present disclosure. At the outset a time-to-trigger (TTT) or other type of measurement report timer has been activated (902). Such a timer can be activated due to a signal falling below a threshold value. The process operates on a continuous signal (904). In some embodiments, the signal can be filtered (e.g., using one or more L3 filters, as described above) (906), though the L3 filtering can be skipped in some implementations. The slope of two consecutive samples of the signal can be calculated (908). The Signum function values of the samples can be derived (910). A cumulative total of the Signum values can be computed and tracked (912). If the cumulative total of the Signum values is greater than or equal to a threshold value (914), then the TTT can be reset (916). If not, then the TTT is sustained until the TTT expires or a value causes it to be deactivated (916).

In some embodiments, after the signal is filtered (906), a trend detection logic can determine whether a current filtered sample can reset the TTT (918). If a current filtered sample can reset the TTT (918), then the determination can be made regarding whether the cumulative total meets or exceeds a threshold value (914).

Figure 10:
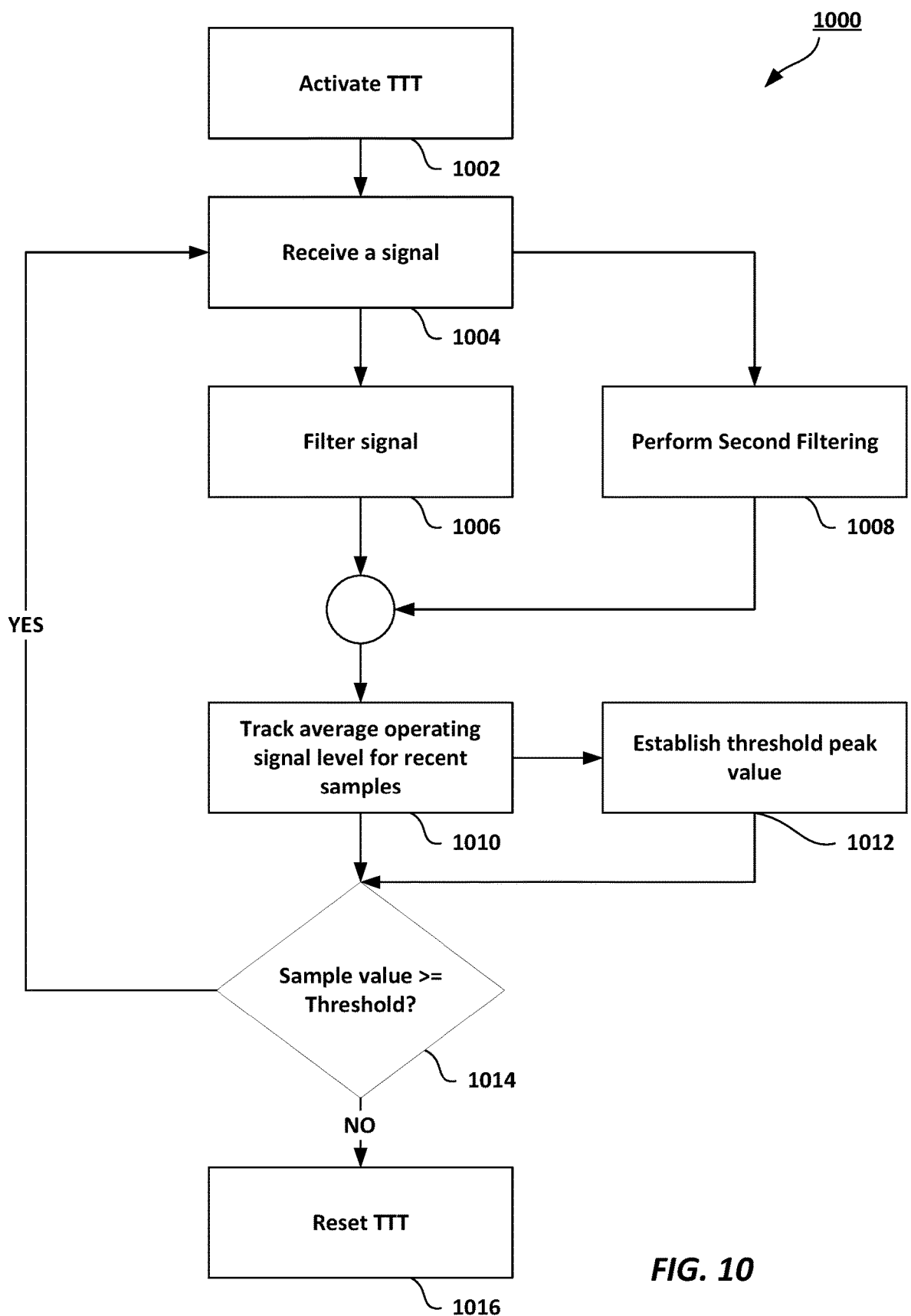
FIG. 10 is a process flow diagram for using an average operating power to determine a weighted value of spikes in a received signal for measurement report timer control in accordance with embodiments of the present disclosure.

FIG. 10 is a process flow diagram 1000 for using an average operating power to determine a weighted value of spikes in a received signal for measurement report timer control in accordance with embodiments of the present disclosure. At the outset a time-to-trigger (TTT) or other type of measurement report timer has been activated (1002). Such a timer can be activated due to a signal falling below a threshold value. The process operates on a continuous signal (1004). The signal can be filtered e.g., using one or more L3 filters using RRC configured and/or proprietary filter coefficients (1006, 1008). The trend detection logic can track the average operating signal level for a set of most recent samples (1010). A threshold peak value can be determined (e.g., dynamically) based on the average operating signal level of the set of most recent samples (1012). If a sample value is greater than or equal to the threshold value, then the TTT can be sustained. If the sample value is not greater than or equal to the threshold value, then the TTT can be reset. For example, if a sudden signal spike is detected and is larger than a maximum threshold value, this spike can be considered an outlier, instead of actual signal improvement.

This disclosure contemplates various methodologies for reducing the errant termination of measurement report timers. The following includes embodiments and implementation details that are within the scope of the disclosure:

DSP Based Approach:

Run a parallel simple single pole IIR high-pass filter when a Meas Quantity is configured. A high-pass filter pursues the details (i.e. fluctuations) of the samples. Trace the outcomes of the filter.

$$y_k = (1-a)y_{k-1} - ax_k,$$

where, the value of a may or may not be associated with the NW given value of filter coefficient to UE in OTA message.

Derive a spike detection threshold based on a function of values of $y_k$ (e.g., mean of past few samples). Discount any outlier based on that threshold to reset the TTT even though L3 filtered value qualifies to reset the TTT. But use this sample value for future computations.

Random Variable Based Considerations—i:

Introduce the concept of "weight factor" to sanitize the spikes in decision making of TTT resets. If a current sample of filtered signal is high enough to reset TTT, UE first compares the sample against a threshold.

$$(\text{Area or height of the spike}) >= w * \text{mean value of current MeasObject}$$

If it is satisfied, only then reset the TTT. Otherwise, keep TTT running, if it is already running, even though L3 filtered value qualifies to reset the TTT.

The weight factor can be a function of mean value of the signal (Meas. Object), variance, speed etc. The rationale is, for example, —the higher the speed, the more likely it is that the UE would have spikes. Similarly, if the signal is already poor, the spikes can be comparably very high with respect to operating signal. The weight factor w accounts for all these. It is possible that UE uses multiple values of w based on different scenarios of operations.

Random Variable Based Considerations—ii:

A simpler consideration can be—UE keeps track of values of most recent x samples. If a current sample of filtered signal is high enough to reset the TTT, UE first checks if any in most recent x samples were strong enough to reset the TTT as well. If there was none, UE ignores the decision based on this sample.

This logic basically tries to discount first occurrence of spike to reset TTT as outlier if there was none in most recent x samples. That is, check the 'consistency' of the spikes.

Statistical Approach—i:

UE maintains few (say, "b") most recent bins each of which contains "x" samples of signal (Meas. Object). For each bin, it computes the RMS value and derive a threshold, Th, based on that. (E.g., some multiple of the avg RMS value etc.). Here, b, x all can be any real integer, 0, 1, 2, . . . etc.).

Now, if a current sample of filtered signal is high enough to reset TTT, UE first compares the sample against Threshold.

Sample value>=Th?
=>This is a noise spike, let TTT be unaffected, i.e., don't reset it if it is already running. But use this sample value for future bin computations.

Statistical Approach—ii:

An even simpler statistical approach can be— UE maintains few (say, "b") most recent bins each of which contains "x" samples of signal (Meas. Object). For each bin, it remembers max value of spikes and derive a threshold, Th, based on that. Assume, "p" percentile of the max values, $M_p$. Here, b, x, p all can be any real integer, 0, 1, 2, . . . etc.). Say, $$Th(k)=0.8*Th(k-1)+0.2*M_p$$

This is how Th can also be adaptive and continuously updated.

Now, if a current sample of filtered signal is such high that it is about to reset TTT, UE first compares the sample against Th.

Sample value>=Th?
=>This is a noise spike, let TTT be unaffected, i.e., don't reset it if it is already running. But use this sample value for future computations.

Wavelet Based Approach:

UE can deploy wavelet transform based approach for unsupervised spike detection. This can be little computationally expensive but may appear a sophisticated method for future.

1) Perform decomposition of the signal using a wavelet basis.
2) Separate the signal and noise at each scale.
3) Perform Bayesian hypothesis testing at different scales to assess the presence of spikes.
4) Combine the decisions at different scales.
5) Estimate the position of individual spikes.

Some windowed approach may be considered. Wavelet coefficients measure the similarity between the signal and the wavelet basis. Thus, to select a spike-like mother wavelet is reasonable. To be computationally efficient, Haar, db2 etc. wavelet function can be deployed.

Other Variations

Some TBD biases can be created based on PCell, SCell, EN-DC combinations, presence of DRX mode etc. to discriminate the severity of the MRMs triggering.

Some bias can also be introduced for impact of Measurement Objects (i.e. not necessarily all Meas. Object should be treated similarly for same filter coefficients.)

Figure 11:
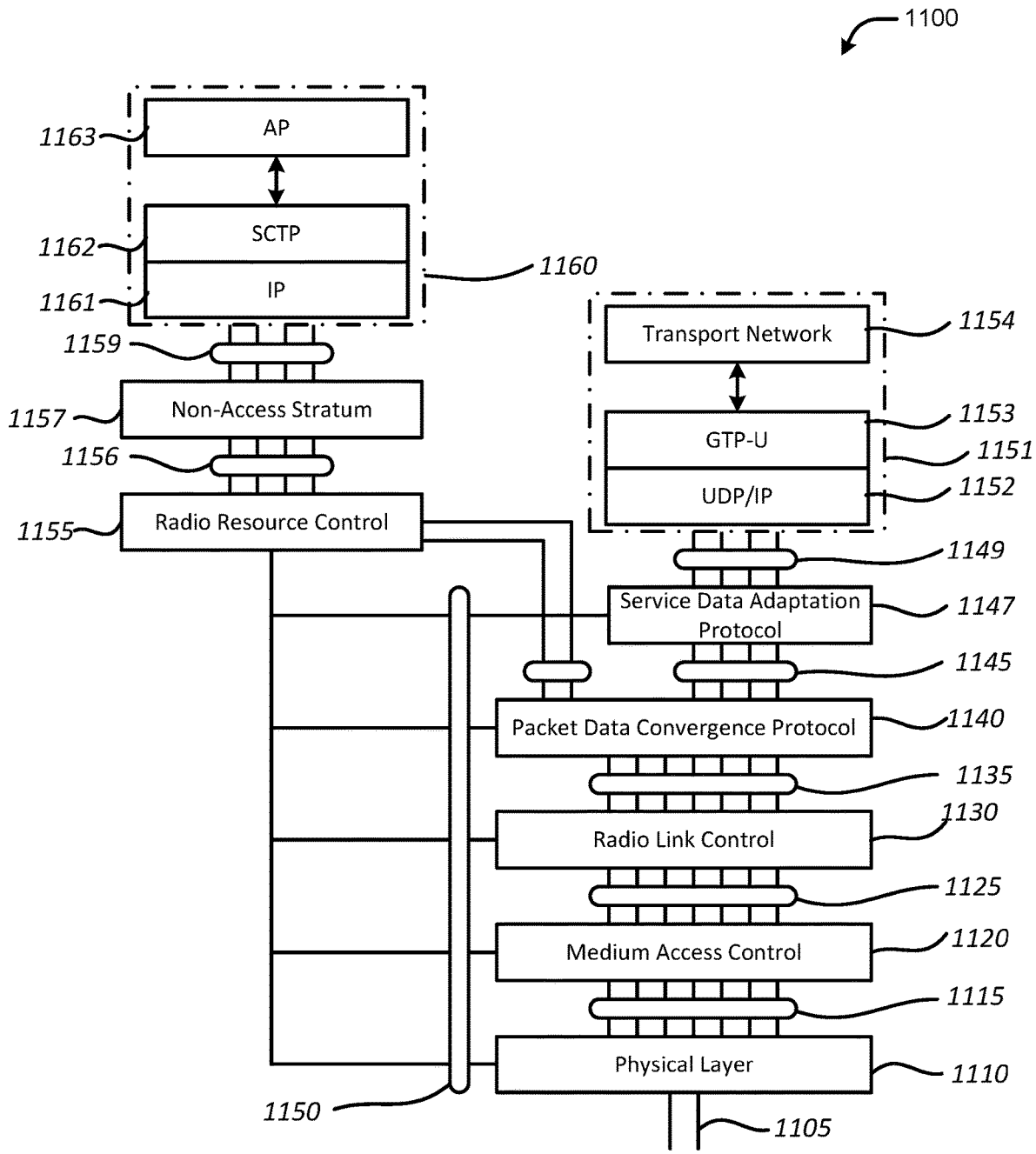
FIG. 11 illustrates various protocol functions that may be implemented in a wireless communication device according to various embodiments.

FIG. 11 illustrates various protocol functions that may be implemented in a wireless communication device according to various embodiments. In particular, FIG. 11 includes an arrangement 1100 showing interconnections between various protocol layers/entities. The following description of FIG. 11 is provided for various protocol layers/entities that operate in conjunction with the 5G/NR system standards and LTE system standards, but some or all of the aspects of FIG. 11 may be applicable to other wireless communication network systems as well.

The protocol layers of arrangement 1100 may include one or more of PHY 1110, MAC 1120, RLC 1130, PDCP 1140, SDAP 1147, RRC 1155, and NAS layer 1157, in addition to other higher layer functions not illustrated. The protocol layers may include one or more service access points (e.g., items 1159, 1156, 1150, 1149, 1145, 1135, 1125, and 1115 in FIG. 11) that may provide communication between two or more protocol layers.

The PHY 1110 may transmit and receive physical layer signals 1105 that may be received from or transmitted to one or more other communication devices. The physical layer signals 1105 may comprise one or more physical channels, such as those discussed herein. The PHY 1110 may further perform link adaptation or adaptive modulation and coding (AMC), power control, cell search (e.g., for initial synchronization and handover purposes), and other measurements used by higher layers, such as the RRC 1155. The PHY 1110 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1110 may process requests from and provide indications to an instance of MAC 1120 via one or more PHY-SAP 1115. According to some embodiments, requests and indications communicated via PHY-SAP 1115 may comprise one or more transport channels.

Instance(s) of MAC 1120 may process requests from, and provide indications to, an instance of RLC 1130 via one or more MAC-SAPs 1125. These requests and indications communicated via the MAC-SAP 1125 may comprise one or more logical channels. The MAC 1120 may perform mapping between the logical channels and transport channels, multiplexing of MAC SDUs from one or more logical channels onto TBs to be delivered to PHY 1110 via the transport channels, de-multiplexing MAC SDUs to one or more logical channels from TBs delivered from the PHY 1110 via transport channels, multiplexing MAC SDUs onto TBs, scheduling information reporting, error correction through HARQ, and logical channel prioritization.

Instance(s) of RLC 1130 may process requests from and provide indications to an instance of PDCP 1140 via one or more radio link control service access points (RLC-SAP) 1135. These requests and indications communicated via RLC-SAP 1135 may comprise one or more RLC channels. The RLC 1130 may operate in a plurality of modes of operation, including: Transparent Mode (TM), Unacknowledged Mode (UM), and Acknowledged Mode (AM). The RLC 1130 may execute transfer of upper layer protocol data units (PDUs), error correction through automatic repeat request (ARQ) for AM data transfers, and concatenation, segmentation and reassembly of RLC SDUs for UM and AM data transfers. The RLC 1130 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1140 may process requests from and provide indications to instance(s) of RRC 1155 and/or instance(s) of SDAP 1147 via one or more packet data convergence protocol service access points (PDCP-SAP) 1145. These requests and indications communicated via PDCP-SAP 1145 may comprise one or more radio bearers. The PDCP 1140 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1147 may process requests from and provide indications to one or more higher layer protocol entities via one or more SDAP-SAP 1149. These requests and indications communicated via SDAP-SAP 1149 may comprise one or more QoS flows. The SDAP 1147 may map QoS flows to DRBs, and vice versa, and may also mark QFIs in DL and UL packets. A single SDAP entity 1147 may be configured for an individual PDU session. In the UL direction, the NG-RAN 110 may control the mapping of QoS Flows to DRB(s) in two different ways, reflective mapping or explicit mapping. For reflective mapping, the SDAP 1147 of a UE 101 may monitor the QFIs of the DL packets for each DRB, and may apply the same mapping for packets flowing in the UL direction. For a DRB, the SDAP 1147 of the UE 101 may map the UL packets belonging to the QoS flows(s) corresponding to the QoS flow ID(s) and PDU session observed in the DL packets for that DRB. To enable reflective mapping, the NG-RAN XR210 may mark DL packets over the Uu interface with a QoS flow ID. The explicit mapping may involve the RRC 1155 configuring the SDAP 1147 with an explicit QoS flow to DRB mapping rule, which may be stored and followed by the SDAP 1147. In embodiments, the SDAP 1147 may only be used in NR implementations and may not be used in LTE implementations.

The RRC 1155 may configure, via one or more management service access points (M-SAP), aspects of one or more protocol layers, which may include one or more instances of PHY 1110, MAC 1120, RLC 1130, PDCP 1140 and SDAP 1147. In embodiments, an instance of RRC 1155 may process requests from and provide indications to one or more NAS entities 1157 via one or more RRC-SAPs 1156. The main services and functions of the RRC 1155 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1157 may form the highest stratum of the control plane between the UE 101 and the AMF XR221. The NAS 1157 may support the mobility of the UEs 101 and the session management procedures to establish and maintain IP connectivity between the UE 101 and a P-GW in LTE systems.

According to various embodiments, one or more protocol entities of arrangement 1100 may be implemented in UEs 101, RAN nodes 111, AMF XR221 in NR implementations or MME XR121 in LTE implementations, UPF XR202 in NR implementations or S-GW XR122 and P-GW XR123 in LTE implementations, or the like to be used for control plane or user plane communications protocol stack between the aforementioned devices. In such embodiments, one or more protocol entities that may be implemented in one or more of UE 101, gNB 111, AMF XR221, etc. May communicate with a respective peer protocol entity that may be implemented in or on another device using the services of respective lower layer protocol entities to perform such communication. In some embodiments, a gNB-CU of the gNB 111 may host the RRC 1155, SDAP 1147, and PDCP 1140 of the gNB that controls the operation of one or more gNB-DUs, and the gNB-DUs of the gNB 111 may each host the RLC 1130, MAC 1120, and PHY 1110 of the gNB 111.

In a first example, a control plane protocol stack may comprise, in order from highest layer to lowest layer, NAS 1157, RRC 1155, PDCP 1140, RLC 1130, MAC 1120, and PHY 1110. In this example, upper layers 1160 may be built on top of the NAS 1157, which includes an IP layer 1161, an SCTP 1162, and an application layer signaling protocol (AP) 1163.

In NR implementations, the AP 1163 may be an NG application protocol layer (NGAP or NG-AP) 1163 for the NG interface 113 defined between the NG-RAN node 111 and the AMF XR221, or the AP 1163 may be an Xn application protocol layer (XnAP or Xn-AP) 1163 for the Xn interface 112 that is defined between two or more RAN nodes 111.

The NG-AP 1163 may support the functions of the NG interface 113 and may comprise Elementary Procedures (EPs). An NG-AP EP may be a unit of interaction between the NG-RAN node 111 and the AMF XR221. The NG-AP 1163 services may comprise two groups: UE-associated services (e.g., services related to a UE 101) and non-UE-associated services (e.g., services related to the whole NG interface instance between the NG-RAN node 111 and AMF XR221). These services may include functions including, but not limited to: a paging function for the sending of paging requests to NG-RAN nodes 111 involved in a particular paging area; a UE context management function for allowing the AMF XR221 to establish, modify, and/or release a UE context in the AMF XR221 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF XR221; a NAS node selection function for determining an association between the AMF XR221 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 1163 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN XR110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 1163 may be an S1 Application Protocol layer (S1-AP) 1163 for the S1 interface 113 defined between an E-UTRAN node 111 and an MME, or the AP 1163 may be an X2 application protocol layer (X2AP or X2-AP) 1163 for the X2 interface 112 that is defined between two or more E-UTRAN nodes 111.

The S1 Application Protocol layer (S1-AP) 1163 may support the functions of the S1 interface, and similar to the NG-AP discussed previously, the S1-AP may comprise S1-AP EPs. An S1-AP EP may be a unit of interaction between the E-UTRAN node 111 and an MME XR121 within an LTE CN 120. The S1-AP 1163 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1163 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 1162 may provide guaranteed delivery of application layer messages (e.g., NGAP or XnAP messages in NR implementations, or S1-AP or X2AP messages in LTE implementations). The SCTP 1162 may ensure reliable delivery of signaling messages between the RAN node 111 and the AMF XR221/MME XR121 based, in part, on the IP protocol, supported by the IP 1161. The Internet Protocol layer (IP) 1161 may be used to perform packet addressing and routing functionality. In some implementations the IP layer 1161 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 1147, PDCP 1140, RLC 1130, MAC 1120, and PHY 1110. The user plane protocol stack may be used for communication between the UE 101, the RAN node 111, and UPF XR202 in NR implementations or an S-GW XR122 and P-GW XR123 in LTE implementations. In this example, upper layers 1151 may be built on top of the SDAP 1147, and may include a user datagram protocol (UDP) and IP security layer (UDP/IP) 1152, a General Packet Radio Service (GPRS) Tunneling Protocol for the user plane layer (GTP-U) 1153, and a User Plane PDU layer (UP PDU) 1163.

The transport network layer 1154 (also referred to as a "transport layer") may be built on IP transport, and the GTP-U 1153 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1153 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 111 and the S-GW XR122 may utilize an S1-U interface to exchange user plane data via a protocol stack comprising an L1 layer (e.g., PHY 1110), an L2 layer (e.g., MAC 1120, RLC 1130, PDCP 1140, and/or SDAP 1147), the UDP/IP layer 1152, and the GTP-U 1153. The S-GW XR122 and the P-GW XR123 may utilize an S5/S8a interface to exchange user plane data via a protocol stack comprising an L1 layer, an L2 layer, the UDP/IP layer 1152, and the GTP-U 1153. As discussed previously, NAS protocols may support the mobility of the UE 101 and the session management procedures to establish and maintain IP connectivity between the UE 101 and the P-GW XR123.

Moreover, although not shown by FIG. 11, an application layer may be present above the AP 1163 and/or the transport network layer 1154. The application layer may be a layer in which a user of the UE 101, RAN node 111, or other network element interacts with software applications being executed, for example, by application circuitry 205, respectively. The application layer may also provide one or more interfaces for software applications to interact with communications systems of the UE 101 or RAN node 111, such as the baseband circuitry 310. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 12:
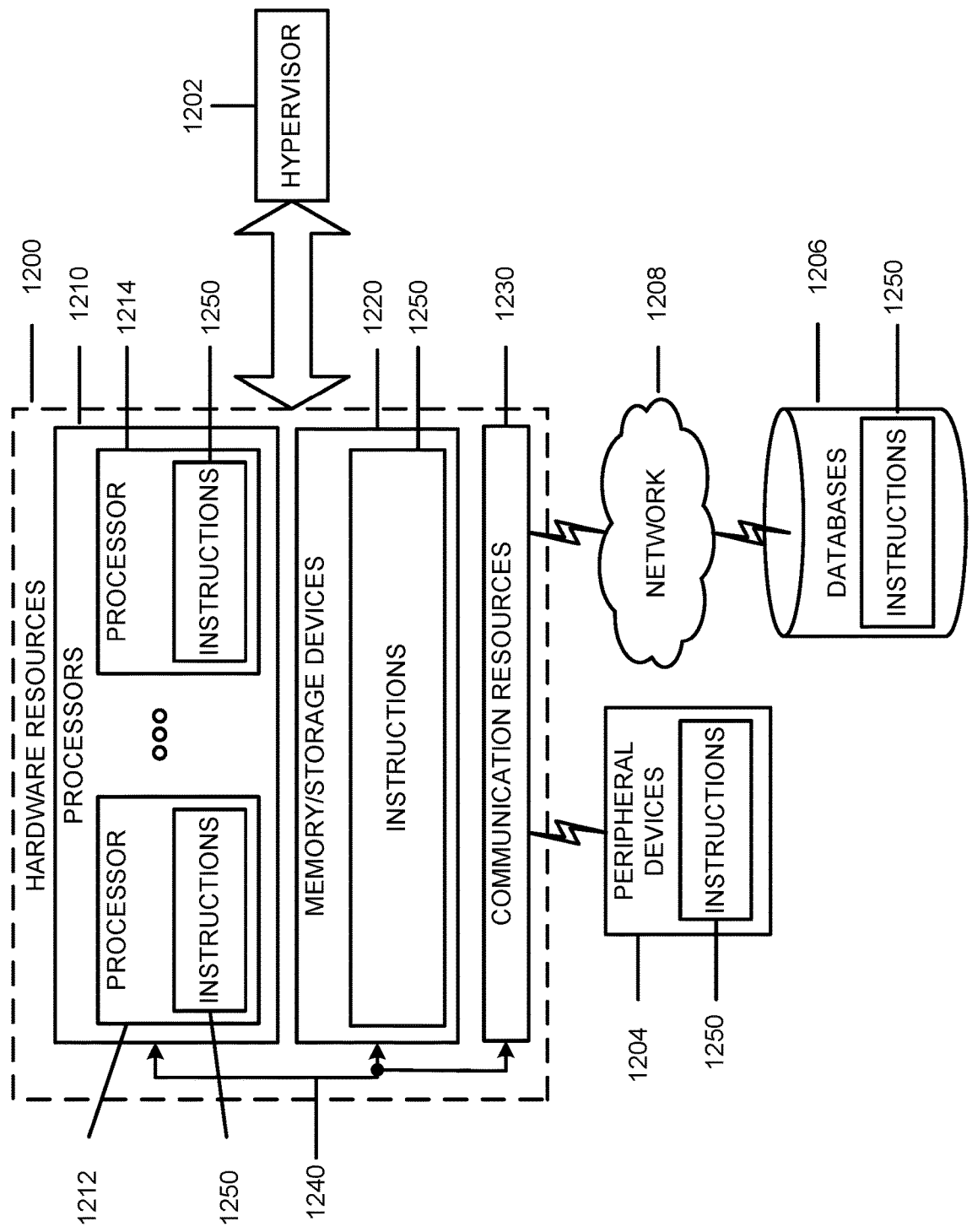
FIG. 12 is a block diagram illustrating components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 may include, for example, a processor 1212 and a processor 1214. The processor(s) 1210 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1220 may include main memory, disk storage, or any suitable combination thereof. The memory/storage devices 1220 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via USB), cellular communication components, NFC components, Bluetooth® (or Bluetooth® Low Energy) components, Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Reference in the specification to "an embodiment," "one embodiment" "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. if the specification or claim refers to "a" or "an" element, that does not mean there is only one of the elements. if the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an apparatus to be implemented in a user equipment (UE), the apparatus including circuitry to activate a timer for transmitting a measurement report to a base station; circuitry to output a filtered signal value from a measured signal using a first parameter; circuitry to determine a trend in signal quality based on the first filtered signal value and a second filtered signal value based on a second parameter; and circuitry to determine whether to deactivate the timer based on the trend in signal quality.

Example 2 may include the subject matter of example 1, wherein the apparatus includes circuitry to output a second filtered signal value from a measured signal using the second parameter, the second parameter different from the first parameter.

Example 3 may include the subject matter of example 2, wherein the circuitry to determine a trend in signal quality includes circuitry to determine a declining trend in signal quality and to sustain the timer based on the declining trend in signal quality.

Example 4 may include the subject matter of example 3, wherein the circuitry is to determine the declining trend in signal quality based on the first filtered signal and the second filtered signal determined to be declining.

Example 5 may include the subject matter of example 3, wherein in the circuitry is to determine the declining trend in signal quality based on the first filtered signal being less than or equal to the second filtered signal and the second filtered signal value being less than a threshold value.

Example 6 may include the subject matter of any of examples 2-5, wherein the circuitry to determine a trend in signal quality includes circuitry to determine an increasing trend in signal quality and to deactivate the timer based on the increasing trend in signal quality.

Example 7 may include the subject matter of example 6, wherein the circuitry is to determine the increasing trend in signal quality based on the first filtered signal and the second filtered signal determined to be increasing.

Example 8 may include the subject matter of example 6, wherein in the circuitry is to determine the increasing trend in signal quality based on the first filtered signal being greater than or equal to the second filtered signal and the second filtered signal value being greater than a threshold value.

Example 9 may include the subject matter of any of examples 1-8. The apparatus of claim 1, wherein the first parameter is provided by a network controller.

Example 10 may include the subject matter of any of examples 1-9, wherein the second parameter is determined based on a radio frequency condition or sensor information.

Example 11 may include the subject matter of example 1, wherein the apparatus includes circuitry to determine a second filtered signal value based on an average value between two or more instantaneous measured signal values using the second parameter and to compare the two or more average values against the first filtered signal value.

Example 12 may include the subject matter of example 11, wherein the circuitry to determine a trend in signal quality includes circuitry to determine a declining trend in signal quality and to sustain the timer based on the declining trend in signal quality.

Example 13 may include the subject matter of any of examples 11 or 12, wherein the circuitry to determine a trend in signal quality includes circuitry to determine a increasing trend in signal quality and to deactivate the timer based on the increasing trend in signal quality.

Example 14 is a method performed by a user equipment, the method including activating a timer for transmitting a measurement report to a base station; determining a first filtered signal value of a measured signal using a first parameter; determining a trend in the measured signal using the first filtered signal value and a second parameter; and determining whether to deactivate or sustain the timer based on the trend in the measured signal.

Example 15 may include the subject matter of example 14, further including determining a second filtered signal value from a measured signal using the second parameter, the second parameter different from the first parameter.

Example 16 may include the subject matter of example 15, further including determining a declining trend in signal quality and to sustain the timer based on the declining trend in signal quality.

Example 17 may include the subject matter of example 16, further including determining the declining trend in signal quality based on the first filtered signal and the second filtered signal determined to be declining.

Example 18 may include the subject matter of example 16, further including determining the declining trend in signal quality based on the first filtered signal being less than or equal to the second filtered signal and the second filtered signal value being less than a threshold value.

Example 19 may include the subject matter of any of examples 15-18, further including determining an increasing trend in signal quality and to deactivate the timer based on the increasing trend in signal quality.

Example 20 may include the subject matter of example 19, further including determining the increasing trend in signal quality based on the first filtered signal and the second filtered signal determined to be increasing.

Example 21 may include the subject matter of example 19, further including determining the increasing trend in signal quality based on the first filtered signal being greater than or equal to the second filtered signal and the second filtered signal value being greater than a threshold value.

Example 22 may include the subject matter of any of examples 14-21, wherein the first parameter is provided by a network controller.

Example 23 may include the subject matter of any of examples 14-21, wherein the second parameter is determined based on a radio frequency condition or sensor information.

Example 24 may include the subject matter of example 14, wherein the method includes determining a second filtered signal value based on an average value between two or more instantaneous measured signal values using the second parameter and to compare the two or more average values against the first filtered signal value.

Example 25 may include the subject matter of example 24, wherein determining a trend in signal quality includes determining a declining trend in signal quality and to sustain the timer based on the declining trend in signal quality.

Example 26 may include the subject matter of any of examples 24, wherein determining a trend in signal quality includes determining a increasing trend in signal quality and to deactivate the timer based on the increasing trend in signal quality.

Example 27 is a processor for a user equipment (UE), the processor including communication circuitry to execute one or more instructions that when executed, cause the processor to perform operations including receiving a signal from a base station; and processing circuitry to activate a timer for transmitting a measurement report to the base station based on the received signal; filter the received signal using a first parameter to generate a filtered signal; determine a trend in the received signal using the filtered signal and a second parameter, and determine whether to deactivate or sustain the timer based on the trend.

Example 28 may include the subject matter of example 27, wherein the processing circuitry is to output a second filtered signal value from a measured signal using the second parameter, the second parameter different from the first parameter.

Example 29 may include the subject matter of example 28, wherein the processing circuitry is to determine a trend in signal quality includes circuitry to determine a declining trend in signal quality and to sustain the timer based on the declining trend in signal quality.

Example 30 may include the subject matter of example 29, wherein the processing circuitry is to determine the declining trend in signal quality based on the first filtered signal and the second filtered signal determined to be declining.

Example 31 may include the subject matter of example 29, wherein the processing circuitry is to determine the declining trend in signal quality based on the first filtered signal being less than or equal to the second filtered signal and the second filtered signal value being less than a threshold value.

Example 32 may include the subject matter of any of examples 27-31, wherein the processing circuitry is to determine a trend in signal quality includes circuitry to determine an increasing trend in signal quality and to deactivate the timer based on the increasing trend in signal quality.

Example 33 may include the subject matter of example 32, wherein the processing circuitry is to determine the increasing trend in signal quality based on the first filtered signal and the second filtered signal determined to be increasing.

Example 34 may include the subject matter of example 32, wherein the processing circuitry is to determine the increasing trend in signal quality based on the first filtered signal being greater than or equal to the second filtered signal and the second filtered signal value being greater than a threshold value.

Example 35 may include the subject matter of any of examples 21-34, wherein the first parameter is provided by a network controller.

Example 36 may include the subject matter of any of examples 21-35, wherein the second parameter is determined based on a radio frequency condition or sensor information.

Example 37 may include the subject matter of example 27, wherein the method includes determining a second filtered signal value based on an average value between two or more instantaneous measured signal values using the second parameter and to compare the two or more average values against the first filtered signal value.

Example 38 may include the subject matter of example 37, wherein determining a trend in signal quality includes determining a declining trend in signal quality and to sustain the timer based on the declining trend in signal quality.

Example 39 may include the subject matter of any of examples 37, wherein determining a trend in signal quality includes determining an increasing trend in signal quality and to deactivate the timer based on the increasing trend in signal quality.

Example 40 is a method performed by a user equipment, the method including receiving a signal from a base station; activating at timer for transmitting a measurement report to the base station based on the received signal; sampling the signal; for two consecutive samples of the signal, calculating a slope of the signal; quantizing the slope of each sample of the signal using a Signum function; calculating a cumulative sum of the quantized slope; determining whether the cumulative sum of the quantized slope is greater than or equal to a threshold value; if the cumulative sum of the quantized slope is greater than or equal to a threshold value, resetting the timer; and if the cumulative sum of the quantized slope is not greater than or equal to a threshold value, continuing to quantize the slope of each sample of the signal using a Signum function; calculate a cumulative sum of the quantized slope; and determine whether the cumulative sum of the quantized slope is greater than or equal to a threshold value.

Example 41 may include the subject matter of example 40, wherein computing the slope of the signal includes filtering the received signal and computing the slope of the filtered signal, wherein performing the filtering of the received signal includes filtering the received signal using a network-provided filter coefficient.

Example 42 may include the subject matter of example 40, further including performing a second filtering of filtered signal prior to computing the slope of the signal.

Example 43 is an apparatus including circuitry to: receive a signal from a base station; activate at timer for transmitting a measurement report to the base station based on the received signal; sample the signal; for two consecutive samples of the signal, calculate a slope of the signal; quantize the slope of each sample of the signal using a Signum function; calculate a cumulative sum of the quantized slope; determine whether the cumulative sum of the quantized slope is greater than or equal to a threshold value; if the cumulative sum of the quantized slope is greater than or equal to a threshold value, reset the timer; and if the cumulative sum of the quantized slope is not greater than or equal to a threshold value, continue to quantize the slope of each sample of the signal using a Signum function; calculate a cumulative sum of the quantized slope; and determine whether the cumulative sum of the quantized slope is greater than or equal to a threshold value.

Example 44 may include the subject matter of example 43, wherein computing the slope of the signal includes filtering the received signal and computing the slope of the filtered signal, wherein performing the filtering of the received signal includes filtering the received signal using a network-provided filter coefficient.

Example 45 may include the subject matter of example 43, further including performing a second filtering of filtered signal prior to computing the slope of the signal.

Example 46 is a method including starting a time to trigger timer; receiving a signal from a base station; filtering the signal to create a filtered signal; tracking an average operating signal value from the filtered signal; setting a maximum threshold value for resetting a time to trigger based on the average operating signal value; determining that a filtered signal sample exceeds the average operating signal value; determining whether the filtered signal sample exceeds the maximum threshold value; if the filtered signal sample does not exceed the maximum threshold value, resetting the time to trigger timer; and if the average operating signal value exceeds the threshold value, continuing the time to trigger timer.

Example 47 may include the subject matter of example 46, wherein filtering the signal includes performing a first filtering of the signal; the method further including performing a second filtering of the signal.

Example 48 may include the subject matter of example 46, wherein tracking the average operating signal value includes taking a set of most recent samples from the filtered signal; and calculating an average value of the set of most recent samples.

Example 49 is an apparatus comprising circuitry to start a time to trigger timer; receive a signal from a base station; filter the signal to create a filtered signal; track an average operating signal value from the filtered signal; set a maximum threshold value for resetting a time to trigger based on the average operating signal value; determine that a filtered signal sample exceeds the average operating signal value; determine whether the filtered signal sample exceeds the maximum threshold value; if the filtered signal sample does not exceed the maximum threshold value, reset the time to trigger timer; and if the average operating signal value exceeds the threshold value, continue the time to trigger timer.

The above examples are provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the disclosure will become apparent from the detailed description taken in conjunction with the accompanying drawings which illustrate, by way of example, the principles of the described embodiments.

What is claimed is:

1. An apparatus to be implemented in a user equipment (UE), the apparatus comprising one or more processors, the one or more processors configured to cause the apparatus to perform operations comprising:
    activating a timer for transmitting a measurement report to a base station;
    generating a first peak filtered signal value from a measured signal using a first filter applying a first parameter;
    generating a second peak filtered signal value from the measured signal using a second filter applying a second parameter;
    determining a spike detection threshold based on past measured signals;
    determining an increasing trend in signal quality based on the first peak filtered signal value and the second peak filtered signal value; and
    deactivating the timer based on (i) the determination of the increasing trend in signal quality and (ii) a determination that neither the first peak filtered signal value nor the second peak filtered signal value satisfies the spike detection threshold.

2. The apparatus of claim 1, wherein determining the increasing trend in signal quality is based on the first peak filtered signal value and the second peak filtered signal value determined to be increasing.

3. The apparatus of claim 1, wherein determining the increasing trend in signal quality is based on the first peak filtered signal value being greater than or equal to the second peak filtered signal value and the second peak filtered signal value being greater than a threshold value that is below the spike detection threshold.

4. The apparatus of claim 1, wherein the first parameter is provided by a network controller, and wherein the second parameter is determined based on a radio frequency condition or sensor information.

5. The apparatus of claim 1, wherein deactivating the timer is based on (i) the determination of the increasing trend in signal quality, (ii) the determination that neither the first peak filtered signal value nor the second peak filtered signal value are above the spike detection threshold, and (iii) a determination that a remaining time left on the timer is below a threshold value.

6. The apparatus of claim 1, wherein determining the increasing trend in signal quality comprises determining one or more Signum function values based on a slope of two or more consecutive samples of the measured signal.

7. The apparatus of claim 1, wherein determining the spike detection threshold comprises using an average operating power of the UE to determine a weighted value of spikes in the measured signal.

8. The apparatus of claim 1, further comprising adjusting the spike detection threshold based on the first peak filtered signal value and the second peak filtered signal value derived from the measured signal.

9. A method performed by a user equipment, the method comprising:
   activating a timer for transmitting a measurement report to a base station;
   determining a first peak filtered signal value of a measured signal using a first filter applying a first parameter;
   determining a second peak filtered signal value of a measured signal using a second filter applying a second parameter;
   determining a spike detection threshold based on past measured signals;
   determining an increasing trend in the measured signal using the first peak filtered signal value and the second parameter; and
   deactivating the timer based on (i) the determination of the increasing trend in signal quality and (ii) a determination that neither the first peak filtered signal value nor the second peak filtered signal value satisfies the spike detection threshold.

10. The method of claim 9, further comprising determining the increasing trend in signal quality based on the first peak filtered signal value and the second peak filtered signal value determined to be increasing.

11. The method of claim 9, further comprising determining the increasing trend in signal quality based on the first peak filtered signal value being greater than or equal to the second peak filtered signal value and the second peak filtered signal value being greater than a threshold value that is below the spike detection threshold.

12. The method of claim 9, wherein the first parameter is provided by a network controller and wherein the second parameter is determined based on a radio frequency condition or sensor information.

13. The method of claim 9, wherein deactivating the timer is based on (i) the determination of the increasing trend in signal quality, (ii) the determination that neither the first peak filtered signal value nor the second peak filtered signal value are above the spike detection threshold, and (iii) a determination that a remaining time left on the timer is below a threshold value.

14. The method of claim 9, wherein determining the increasing trend in signal quality comprises determining one or more Signum function values based on a slope of two or more consecutive samples of the measured signal.

15. The method of claim 9, wherein determining the spike detection threshold comprises using an average operating power of the UE to determine a weighted value of spikes in the measured signal.

16. The method of claim 9, further comprising adjusting the spike detection threshold based on the first peak filtered signal value and the second peak filtered signal value derived from the measured signal.

17. A processor of a user equipment (UE), the processor comprising:
   communication circuitry configured to receive a signal from a base station; and
   processing circuitry configured to:
      activate a timer for transmitting a measurement report to the base station based on the received signal;
      filter the received signal using a first peak filter applying a first parameter to generate a first peak filtered signal;
      filter the received signal using a second peak filter applying a second parameter to generate a second peak filtered signal;
   determining a spike detection threshold based on past measured signals;
      determine an increasing trend in the received signal using the first peak filtered signal and the second parameter, and
      deactivate the timer based on (i) the determination of the increasing trend in signal quality and (ii) a determination that neither the first peak filtered signal nor the second peak filtered signal satisfies the spike detection threshold.

18. The processor of claim 17, wherein deactivating the timer is based on (i) the determination of the increasing trend in signal quality, (ii) the determination that neither the first peak filtered signal nor the second peak filtered signal are above the spike detection threshold, and (iii) a determination that a remaining time left on the timer is below a threshold value.

19. The processor of claim 17, wherein determining the increasing trend in signal quality comprises determining one or more Signum function values based on a slope of two or more consecutive samples of the received signal.

20. The processor of claim 17, wherein determining the spike detection threshold comprises using an average operating power of the UE to determine a weighted value of spikes in the received signal.

* * * * *